United States Patent
Miura et al.

(10) Patent No.: US 11,263,258 B2
(45) Date of Patent: Mar. 1, 2022

(54) INFORMATION PROCESSING METHOD, INFORMATION PROCESSING APPARATUS, AND NON-TRANSITORY COMPUTER-READABLE STORAGE MEDIUM FOR STORING INFORMATION PROCESSING PROGRAM OF SCORING WITH RESPECT TO COMBINATION OF IMAGING METHOD AND TRAINED MODEL

(71) Applicant: FUJITSU LIMITED, Kawasaki (JP)

(72) Inventors: Takashi Miura, Kawasaki (JP); Yusuke Hida, Atsugi (JP); Atsuo Hara, Chikushino (JP); Kyoko Tadaki, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 16/810,925

(22) Filed: Mar. 6, 2020

(65) Prior Publication Data
US 2020/0293570 A1     Sep. 17, 2020

(30) Foreign Application Priority Data
Mar. 15, 2019 (JP) .............................. JP2019-049185

(51) Int. Cl.
*G06K 9/00* (2006.01)
*G06F 16/55* (2019.01)
*G06K 9/62* (2022.01)

(52) U.S. Cl.
CPC ............ *G06F 16/55* (2019.01); *G06K 9/626* (2013.01); *G06K 9/6212* (2013.01); *G06K 9/6256* (2013.01)

(58) Field of Classification Search
CPC .... G06K 9/6212; G06K 9/626; G06K 9/6256; G06K 9/6255; G06K 9/66; G06K 9/6216;
(Continued)

(56) References Cited

U.S. PATENT DOCUMENTS 8,515,212 B1 * 8/2013 Bengio ................ G06K 9/6262
382/305
8,572,011 B1 * 10/2013 Sculley, II ............. G06N 20/00
706/13
(Continued)

FOREIGN PATENT DOCUMENTS

GB          2547712 A    8/2017
JP       2003-076991 A   3/2003
(Continued)

*Primary Examiner* — Amir Alavi
(74) *Attorney, Agent, or Firm* — Fujitsu Patent Center

(57) ABSTRACT

An information processing method implemented by a computer, the information processing method includes: acquiring an image group generated by imaging a data group according to each of a plurality of imaging methods; for each of the acquired image groups, calculating a score of the imaging method used to generate the image group, based on distribution of a first feature value group in a feature value space, and distribution of a second feature value group in the feature value space, the first feature value group being a plurality of feature values output when the image group is input to a trained model outputting feature values corresponding to input images, the second feature value group being a plurality of feature values output when a reference image group is input to the trained model; and outputting the score of the imaging method, the score being calculated for each of the image groups.

13 Claims, 23 Drawing Sheets

(58) Field of Classification Search
CPC ............ G06K 9/00228; G06K 9/6254; G06K 9/4609; G06K 9/48; G06T 7/0083; G06T 7/0081; G06T 2207/10016; H04N 7/0145; G06F 17/30249; G06F 16/55
See application file for complete search history.

(56) References Cited

U.S. PATENT DOCUMENTS

| | | | |
|---|---|---|---|
| 8,873,867 B1 * | 10/2014 | Alldrin | G06F 16/583 |
| | | | 382/224 |
| 8,891,858 B1 * | 11/2014 | Preetham | G06K 9/6202 |
| | | | 382/159 |
| 8,903,182 B1 * | 12/2014 | Duerig | G06F 16/583 |
| | | | 382/224 |
| 9,443,193 B2 * | 9/2016 | Haberman | G06N 20/00 |
| 9,646,227 B2 * | 5/2017 | Suri | G06T 7/20 |
| 9,818,142 B2 * | 11/2017 | Wang | G06F 16/9535 |
| 10,282,792 B2 * | 5/2019 | Yates | G06F 16/9535 |
| 2011/0184950 A1 * | 7/2011 | Skaff | G06K 9/00664 |
| | | | 707/737 |
| 2016/0378863 A1 * | 12/2016 | Shlens | G06N 3/08 |
| | | | 707/769 |
| 2017/0249534 A1 | 8/2017 | Townsend et al. | |
| 2020/0293570 A1 * | 9/2020 | Miura | G06K 9/6256 |

FOREIGN PATENT DOCUMENTS

| | | |
|---|---|---|
| JP | 2009-265082 A | 11/2009 |
| JP | 2017-157213 A | 9/2017 |

* cited by examiner

|  | UNLEARNED NN-a | LEARNED NN-a | UNLEARNED NN-b | LEARNED NN-b |
|---|---|---|---|---|
| NOISE IMAGE GROUP | $B_{0a}$ | $B_{1a}$ | $B_{0b}$ | $B_{1b}$ |
| IMAGING METHOD A | $X_{A,0a}$ | $X_{A,1a}$ | $X_{A,0b}$ | $X_{A,1b}$ |
| IMAGING METHOD B | $X_{B,0a}$ | $X_{B,1a}$ | $X_{B,0b}$ | $X_{B,1b}$ |
| LEARNING IMAGE GROUP USED TO LEARN LEARNED NN | - | $G_{1a}$ | - | $G_{1b}$ |

FIG. 12

|  | UNLEARNED NN-a | LEARNED NN-a | UNLEARNED NN-b | LEARNED NN-b |
|---|---|---|---|---|
| NOISE IMAGE GROUP | $B_{0a}$ | $B_{1a}$ | $B_{0b}$ | $B_{1b}$ |
| IMAGING METHOD A | $X_{A,0a}$ | $X_{A,1a}$ | $X_{A,0b}$ | $X_{A,1b}$ |
| IMAGING METHOD B | $X_{B,0a}$ | $X_{B,1a}$ | $X_{B,0b}$ | $X_{B,1b}$ |
| LEARNING IMAGE GROUP USED TO LEARN LEARNED NN | - | $G_{1a}$ | - | $G_{1b}$ |

LEAST ACCURATE DISTRIBUTION

AS FURTHER, AS BETTER

ESTIMATION TARGET

FIG. 14

|  | UNLEARNED NN-a | LEARNED NN-a | UNLEARNED NN-b | LEARNED NN-b |
|---|---|---|---|---|
| NOISE IMAGE GROUP | $B_{0a}$ | $B_{1a}$ | $B_{0b}$ | $B_{1b}$ |
| IMAGING METHOD A | $X_{A,0a}$ | $X_{A,1a}$ | $X_{A,0b}$ | $X_{A,1b}$ |
| IMAGING METHOD B | $X_{B,0a}$ | $X_{B,1a}$ | $X_{B,0b}$ | $X_{B,1b}$ |
| LEARNING IMAGE GROUP USED TO LEARN LEARNED NN | - | $G_{1a}$ | - | $G_{1b}$ |

LEAST ACCURATE DISTRIBUTION ⟷ ESTIMATION TARGET
AS FURTHER, AS BETTER

FIG. 17

| RANKING | SCORE | TYPE OF LEARNED NN | TYPE OF IMAGING METHOD |
|---------|-------|---------------------|------------------------|
| 1 | 0.98 | NN9 | Img2 |
| 2 | 0.84 | NN9 | Img5 |
| 3 | 0.68 | NN3 | Img8 |
| ⋮ | ⋮ | ⋮ | ⋮ |
| 100 | 0.05 | NN5 | Img1 |

1700

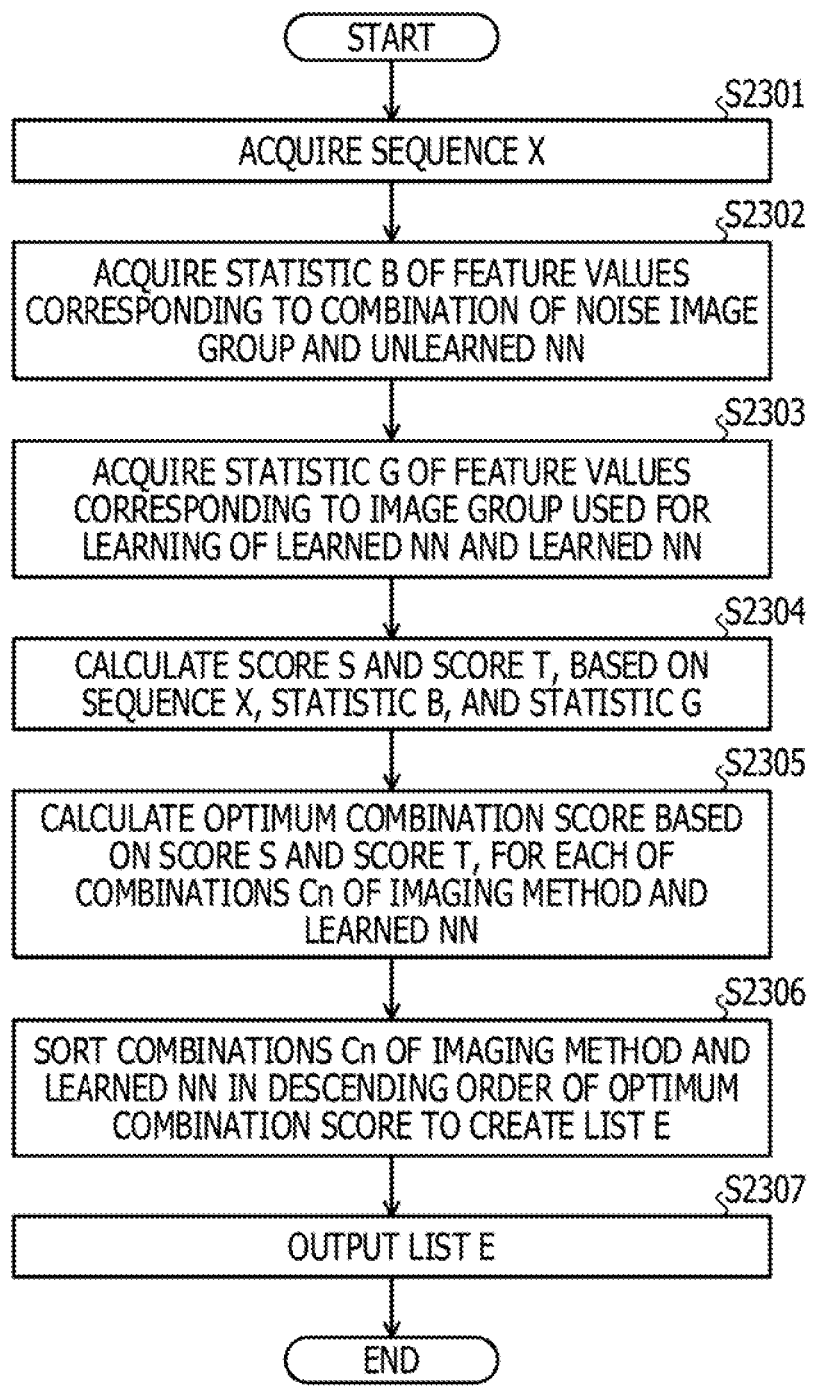

INFORMATION PROCESSING METHOD, INFORMATION PROCESSING APPARATUS, AND NON-TRANSITORY COMPUTER-READABLE STORAGE MEDIUM FOR STORING INFORMATION PROCESSING PROGRAM OF SCORING WITH RESPECT TO COMBINATION OF IMAGING METHOD AND TRAINED MODEL

CROSS-REFERENCE TO RELATED APPLICATION

This application is based upon and claims the benefit of priority of the prior Japanese Patent Application No. 2019-49185, filed on Mar. 15, 2019, the entire contents of which are incorporated herein by reference.

FIELD

The embodiments discussed herein are related to an information processing method, an information processing apparatus, and a non-transitory computer-readable storage medium for storing an information processing program.

BACKGROUND

There are various techniques of analyzing data using a classification model. For example, one technique has attempted to classify data by imaging data and using a learned classification model for classifying images, without creating a new classification model suited for the data.

As prior art, for example, by inputting a result of an improved electrical signal converted from image information of an inspected object, learned data and unlearned data are identified and estimated according to a particular standard. For example, when trained model is updated, based on the number of partial feature value spaces that remain unchanged before and after the updating among partial feature value spaces included in the trained model, "correct data on defect type" set by the inspector is given to defect data to generate the trained model.

Examples of related include Japanese Laid-open Patent Publication No. 2003-76991 and Japanese Laid-open Patent Publication No. 2009-265082.

SUMMARY

According to an aspect of the embodiments, provided is an information processing method implemented by a computer. The information processing method includes: acquiring an image group generated by imaging a data group according to each of a plurality of imaging methods; for each of the acquired image groups, calculating a score of the imaging method used to generate the image group, based on distribution of a first feature value group in a feature value space, and distribution of a second feature value group in the feature value space, the first feature value group being a plurality of feature values output when the image group is input to a trained model outputting feature values corresponding to input images, the second feature value group being a plurality of feature values output when a reference image group is input to the trained model; and outputting the score of the imaging method, the score being calculated for each of the image groups.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is an explanatory diagram (1) illustrating another example of calculation of the score of the imaging method;

FIG. 14 is an explanatory diagram illustrating another example of calculation of the score of the trained NN;

FIG. 17 is an explanatory diagram (2) illustrating the usage example 1 of the information processor 100;

FIG. 23 is a flow chart illustrating an example of a selection processing procedure.

DESCRIPTION OF EMBODIMENT(S)

However, according to the techniques disclosed in described above literatures, it may be difficult to accurately classify data. For example, it is difficult to determine what imaging method facilitates data classification using the learned classification model.

From one aspect, an object of the present disclosure is to accurately classify data.

According to the implementation, data may be accurately classified.

Hereinafter, embodiments of an information processing method, an information processing program, and an information processor according to the present disclosure are described in detail with reference to the drawings.

(Example of Information Processing Method According to Embodiment)

Figure 1:
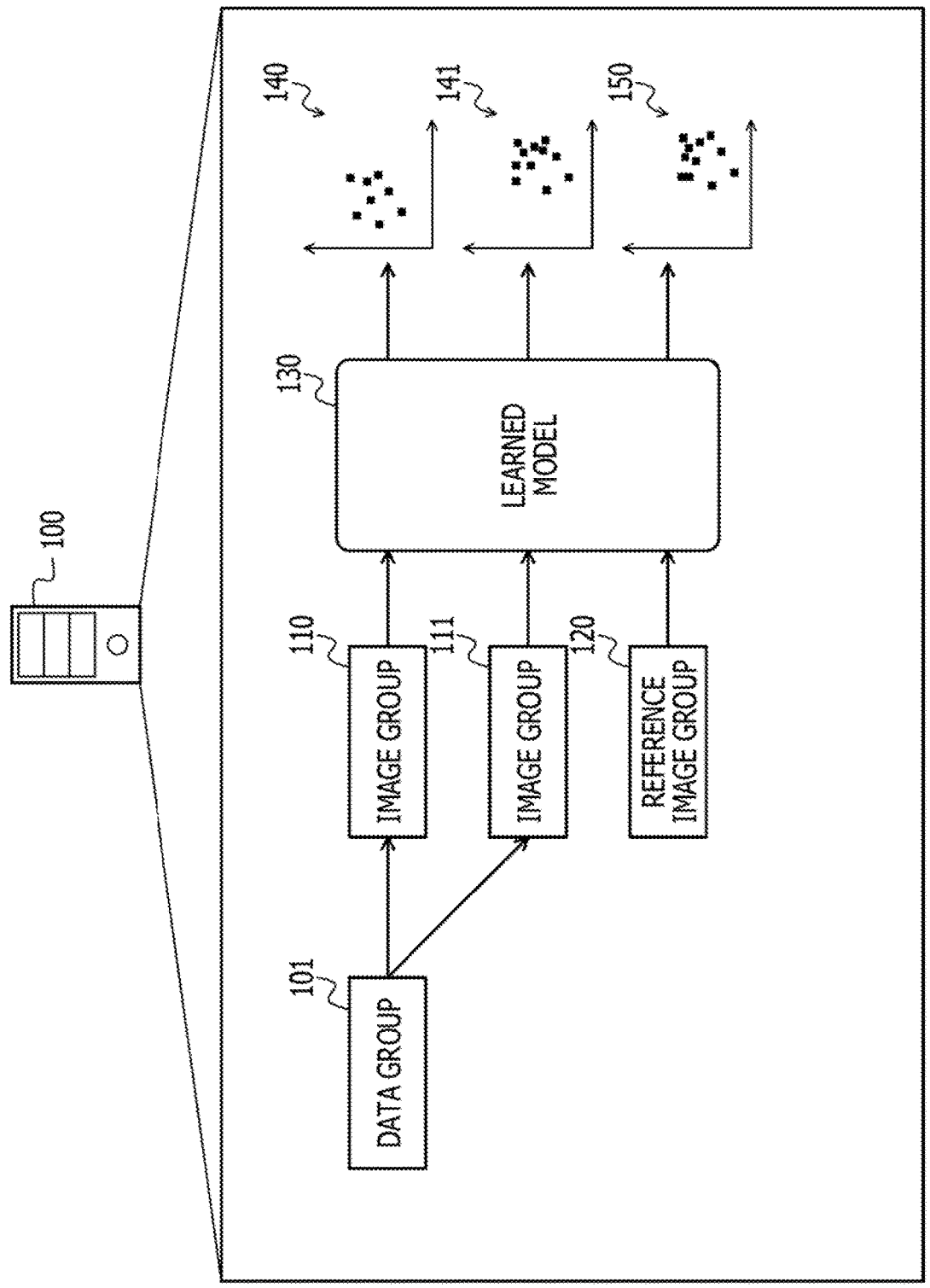
FIG. 1 is an explanatory diagram (1) illustrating an example of n information processing method according to an embodiment.
Figure 2:
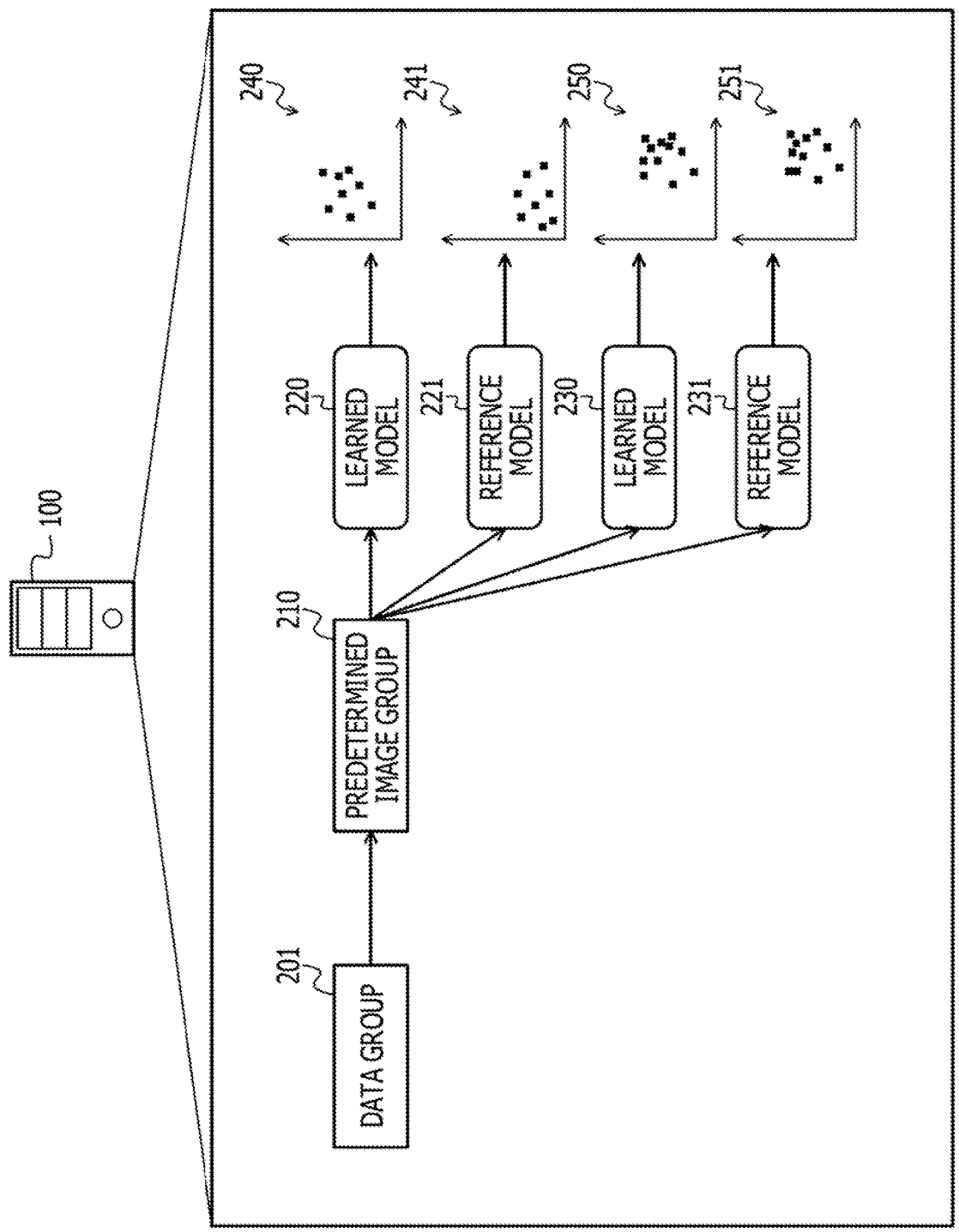
FIG. 2 is an explanatory diagram (2) illustrating an example of the information processing method according to the embodiment.

FIGS. 1 and 2 are explanatory diagrams illustrating an example of an information processing method according to an embodiment. An information processor 100 is a computer for accurately classifying data. The information processor 100 is, for example, a server, a personal computer (PC), or the like. The data is, for example, numerical data.

For example, one data classification technique attempts to classify data by imaging data and reusing a trained model for classifying images, without creating a new classification model suited for the data.

This technique is also referred to as Imagification. The trained model (may be referred to as "the learned model") is a model that outputs feature values corresponding to input images. The trained model is, for example, a neural network. Specifically, the trained model may be a model published in the Open Source Software. In following description, the neural network may be also described as "NN". This technique requires no new classification model suited for data and requires no enormous volume for creating teacher data.

However, according to this technique, data may not be classified at high accuracy, for example, because there are a plurality of imaging methods applicable to the method. For example, because there are a plurality of imaging methods applicable to the method. In such case, it is difficult to determine which imaging method may be used to image data to be classified so as to be facilitate data classification using a trained model. In imaging data, unless a suitable imaging method for data is used, even when image data is input to the trained model, the data may not be accurately classified.

On the contrary, it may be contemplated to manually or automatically examine a suitable imaging method for data. However, in this case, enormous volume of data is prepared, and the operator examines a plurality of imaging methods one by one as to whether the imaging method is suitable for the data. Thus, operation amount and operation time for the operation of examining the appropriate imaging method tends to be enormous, leading to an increase in operation loads of the operator classifying the data. A specific example of the increase in operation loads of the classification operator will be described later with reference to FIG. 15 for example.

Further, a plurality of trained models applicable to this technique may be present. In this case, after imaging data to be classified, it is difficult to determine which trained model is used to input the image data thereto so as to accurately classify the data. In addition, unless the image data is input to the suitable trained model for the data, the data may not be classified at high accuracy.

On the contrary, it may be contemplated to manually or automatically examine the suitable trained model for data. However, in this case, enormous volume of data is prepared, and the operator examines a plurality of trained models one by one as to whether the trained model is suitable for the data. Thus, operation amount and operation time for the operation of examining the appropriate trained model tends to be enormous, leading to an increase in operation loads of the operator classifying the data. A specific example of the increase in operation loads of the classification operator will be described later with reference to FIG. 15, for example.

Therefore, it is desired to identify the suitable combination of the imaging method and the trained model for data to be classified. Further, it is desired to suppress an increase in time required to identify the suitable combination of the imaging method and the trained model for data to be classified.

Thus, the present embodiment describes an information processing method that enables accurate data classification by referring to distribution of a feature value group output when an image group generated by imaging a data group is input to the trained model in a feature value space.

Referring to FIG. 1, for clarification of examination, an example in which a plurality of imaging methods and one trained model are present will be described below. An example in which a plurality of trained models are present will be described later with reference to FIG. 2.

In FIG. 1, (1-1) The information processor 100 acquires a plurality of image groups generated by imaging a data group according to the imaging methods. For example, the information processor 100 acquires the image groups generated by imaging the data group according to the plurality of imaging methods.

Here, the information processor 100 may acquire the image group generated by imaging the data group according to each of the plurality of imaging methods, either from the processor itself or another device. In the example illustrated in FIG. 1, the information processor 100 acquires image groups 110, 111 generated by imaging a data group 101.

(1-2) For each of the acquired image groups, the information processor 100 calculates a score of the imaging method used to generate the image group. For example, for each of the image groups, the information processor 100 calculates the score of the imaging method used to generate the image group, based on the distribution of a feature value group acquired from the image group using the trained model and the feature value group acquired from the reference image group using the trained model in a feature value space.

The reference image group is, for example, a noise image group that is hard to be classified using the trained model. The feature value group acquired from the image group using the trained model is the feature value group output from the trained model when each image in the image group is input to the trained model. The feature value group acquired from the reference image group using the trained model is, for example, the feature value group output from the trained model when each image in the reference image group is input to the trained model.

Since the reference image group is the noise image group that is hard to be classified using the trained model, the distribution of the feature value group acquired from the reference image group using the trained model may be a sample in the case of failure of data classification. Accordingly, as the distribution of the feature value group acquired from the image group is less similar to the distribution of the feature value group acquired from the reference image group, the contribution of the imaging method used to generate the image group to an improvement in the data classification accuracy is larger. Preferably, as the contribution of the imaging method to the data classification accuracy is larger, the score of the imaging method is set to be higher.

In the example illustrated in FIG. 1, the information processor 100 acquires a feature value group 140 acquired from an image group 110 using a trained model 130 and a feature value group 150 acquired from a reference image group 120 using the trained model 130. The information processor 100 calculates the score of the imaging method used to generate the image group 110, based on the distribution of the feature value groups 140, 150 in the feature value space.

The information processor 100 acquires a feature value group 141 acquired from an image group 111 using the trained model 130 and the feature value group 150 acquired from the reference image group 120 using the trained model 130. The information processor 100 calculates the score of the imaging method used to generate the image group 111, based on the distribution of the feature value groups 141, 150 in the feature value space. Here, since the distribution of the feature value group 140 is further from the distribution of the feature value group 150 than the distribution of the feature value group 141, the information processor 100 calculates the score of the imaging method used to generate the image group 110 to be larger than the score of the imaging method used to generate the image group 111.

(1-3) The information processor 100 outputs the score of the imaging method calculated for each of the image groups. In the example illustrated in FIG. 1, the information processor 100 outputs the score of the imaging method used to generate the image group 110 and the score of the imaging method used to generate the image group 111. For example, a destination for outputting is a display of another device that is viewable to the operator classifying data.

In this manner, the information processor 100 may examine which of the plurality of imaging methods is the suitable imaging method for data with a relatively small operation amount. Then, the information processor 100 may facilitate the classification operator to refer to the score and recognize which of the plurality of imaging methods is the suitable imaging method for the data. Thus, the information processor 100 may reduce operation loads of the classification operator.

In the above description, the information processor 100 uses the noise image group that is hard to be classified using the trained model, as the reference image group. However, the present disclosure is not limited to this. For example, the information processor 100 may use an optimum image group that may be accurately classified using the trained model as the reference image group. In this case, the information processor 100 is preferably configured such that as the distribution of the feature value group acquired from the image group is more similar to the distribution of the feature value group acquired from the reference image group, the score of the imaging method used to generate the image group is set to be higher. Next, description continues with reference to FIG. 2.

In the example illustrated in FIG. 2, for clarification of explanation, one imaging method and a plurality of trained models are present.

In FIG. 2, (2-1) the information processor 100 acquires a plurality of trained models and reference models. The reference model is a model that is associated with the trained model and varies depending on the trained model. The reference model is, for example, an untrained model that is a source of the trained model. For example, the untrained model is in a state where parameters are initialized.

In the example illustrated in FIG. 2, the information processor 100 acquires a trained model 220, a reference model 221 corresponding to the trained model 220, a trained model 230, and a reference model 231 corresponding to the trained model 230.

(2-2) For each of the acquired trained models, the information processor 100 calculates the score. For example, for each of the trained models, the information processor 100 calculates the score of the trained model, based on the distribution of the feature value group acquired from a predetermined image group using the trained model and the feature value group acquired from the predetermined image group using the reference model in the feature value space. The predetermined image group is generated by, for example, imaging the data group.

The feature value group acquired from the predetermined image group using the trained model is, for example, a feature value group output from the trained model when the predetermined image group is input to the trained model. The feature value group acquired from the predetermined image group using the reference model is, for example, a feature value group output from the reference model when the predetermined image group is input to the reference model.

Here, since the reference model is the untrained model, the distribution of the feature value group acquired from the predetermined image group using the reference model may be a sample in the case of a failure of data classification. Accordingly, as the distribution of the feature value group acquired from the predetermined image group using the trained model is less similar to the distribution of the feature value group acquired from the predetermined image group using the reference model, the contribution of the trained model to an improvement in the data classification accuracy is larger. Preferably, as the contribution of the trained model to an improvement in the data classification accuracy is larger, the score is set to be higher.

In the example illustrated in FIG. 2, the information processor 100 acquires a predetermined image group 210 generated by imaging a data group 201. The information processor 100 acquires a feature value group 240 acquired from the predetermined image group 210 using the trained model 220 and a feature value group 241 acquired from the predetermined image group 210 using the reference model 221. The information processor 100 calculates the score of the trained model 220, based on the distribution of the feature value groups 240, 241 in the feature value space.

The information processor 100 also acquires a feature value group 250 acquired from the predetermined image group 210 using the trained model 230 and a feature value group 251 acquired from the predetermined image group 210 using the reference model 231. The information processor 100 calculates the score of the trained model 230, based on the distribution of the feature value groups 250, 251 in the feature value space. Here, since the distribution of the feature value group 240 is relatively remote from the distribution of the feature value group 241, the information processor 100 calculates the score of the trained model 220 to be relatively large. On the contrary, since the distribution of the feature value group 250 is relatively close to the distribution of the feature value group 251, the information processor 100 calculates the score of the trained model 230 to be relatively small.

(2-3) The information processor 100 outputs the score of the trained model calculated for each of the trained models. In the example illustrated in FIG. 2, the information processor 100 outputs the score of the trained model 220 and the score of the trained model 230. For example, a destination for outputting is a display of another device that is viewable to the operator classifying data.

In this manner, the information processor 100 may examine which of a plurality of trained models is the suitable trained model for the data with a relatively small operation amount. Thus, the information processor 100 may facilitate the classification operator to refer to the score and recognize which of the plurality of trained models is the suitable trained model for the data. Thus, the information processor 100 may reduce operation loads of the classification operator.

In the above description, the information processor 100 uses the distribution of the feature value group acquired from the predetermined image group using the trained model and the feature value group acquired from the predetermined image group using the reference model in the feature value space. However, the present disclosure is not limited to this. For example, the information processor 100 may also use the distribution of the feature value group acquired from the noise image group using the reference model in the feature value space.

In the example illustrated in FIG. 1, for clarification of explanation, one trained model is present, and in the example illustrated in FIG. 2, for clarification of explanation, one imaging method is present. However, the present disclosure is not limited to this. In following description, a plurality of imaging methods and a plurality of trained models are present. A specific example in which a plurality of imaging methods and a plurality of trained models are present will be described later with reference to FIGS. 7 to 11, for example.

(Example of Information Processing System 300)

Figure 3:
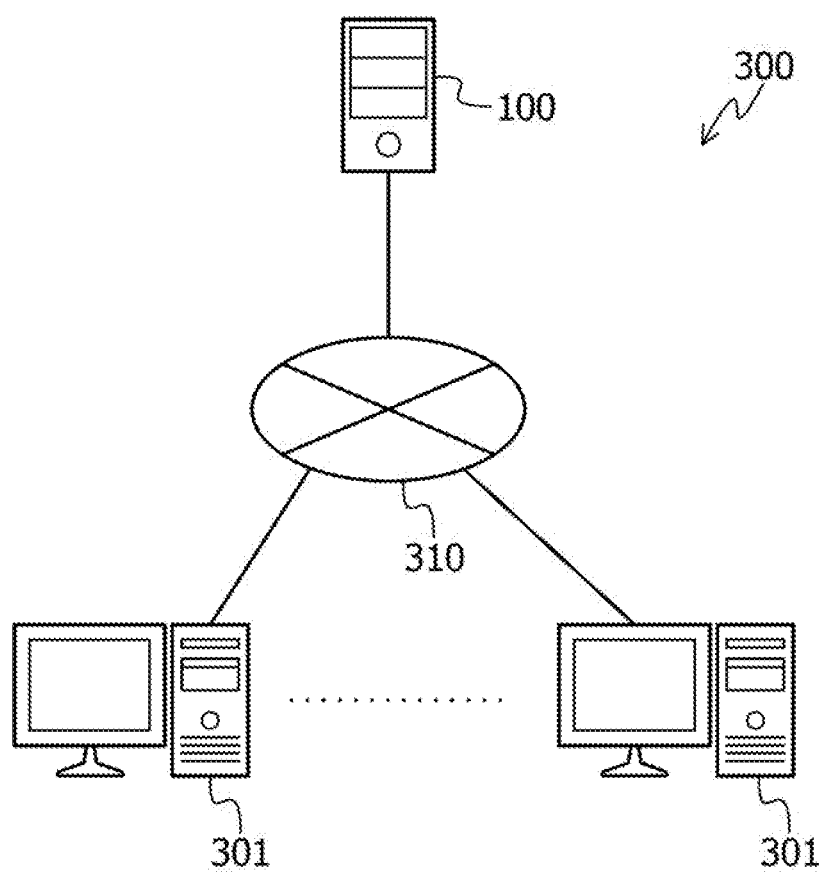
FIG. 3 is an explanatory diagram illustrating an example of an information processing system 300.

Next, referring to FIG. 3, an example of an information processing system 300 to which the information processor 100 illustrated in FIGS. 1 and 2 is applied is described.

FIG. 3 is an explanatory diagram illustrating an example of an information processing system 300. In FIG. 3, the information processing system 300 includes the information processor 100 and a client device 301. In the information processing system 300, the information processor 100 is coupled to the client device 301 via a wired or wireless network 310. The network 310 is, for example, local area network (LAN), wide area network (WAN), the Internet, or the like.

The information processor 100 acquires data to be classified from the client device 301. Specifically, the information processor 100 acquires the data to be classified from one client device 301. Specifically, the information processor 100 may acquire the data to be classified from the plurality of client devices 301. For example, the information processor 100 causes the client device 301 to display a suitable combination of the imaging method and the trained model for data to be classified, based on the data to be classified. The information processor 100 may cause the client device 301 to display a classification result of the data to be classified. The information processor 100 is, for example, a server, a PC, or the like.

The client device 301 is, for example, a computer that transmits data to be classified to the information processor 100. For example, the client device 301 receives the suitable combination of the imaging method and the trained model for the data to be classified from the information processor 100, and displays the combination. For example, the client device 301 may receive a classification result of the data to be classified from the information processor 100, and display the classification result. For example, the client device 301 is a PC, a tablet terminal, a smartphone, or the like. The case where the information processor 100 is a different device from the client device 301 is described herein; however, the embodiment is not limited thereto. For example, there may be the case where the information processor 100 is integral with the client device 301.

(Hardware Configuration Example of Information Processor 100)

Next, a hardware configuration example of the information processor 100 is described with reference to FIG. 4.

Figure 4:
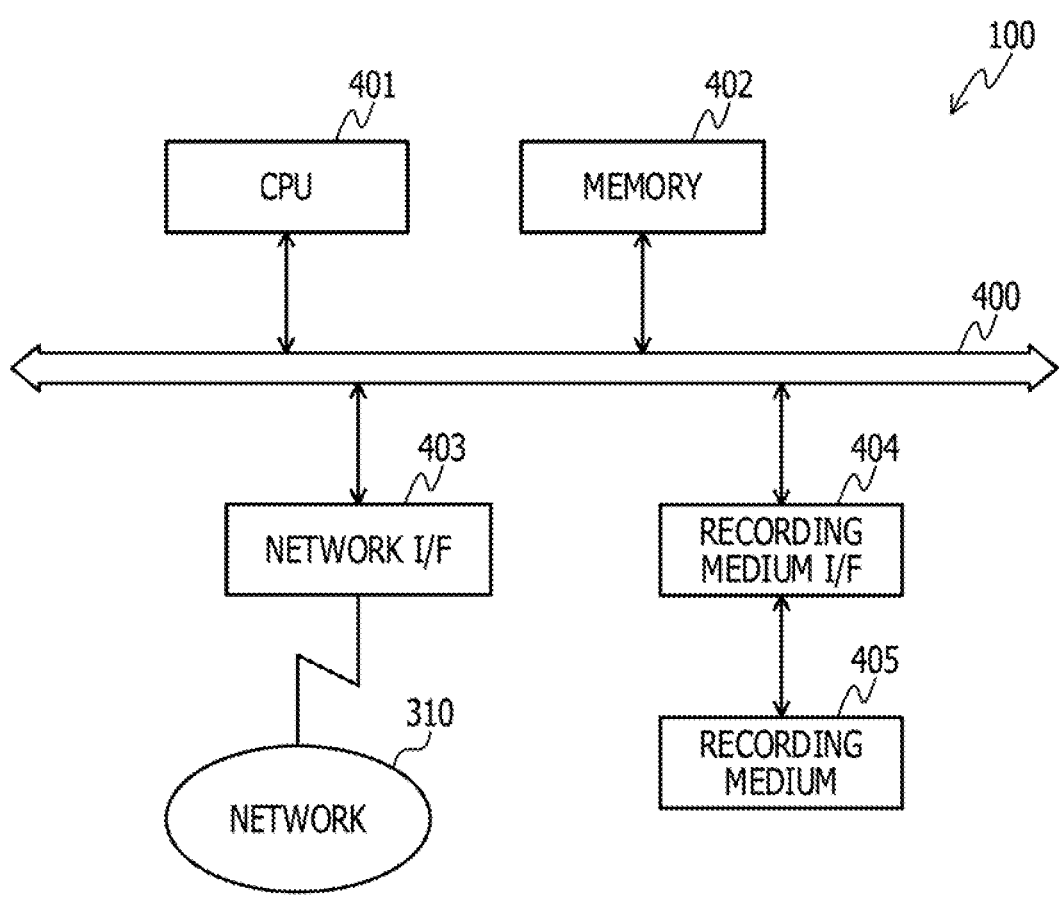
FIG. 4 is a block diagram illustrating a hardware configuration example of the information processor 100.

FIG. 4 is a block diagram illustrating the hardware configuration example of the information processor 100. In FIG. 4, the information processor 100 includes a central processing unit (CPU) 401, a memory 402, a network interface (I/F) 403, a recording medium I/F 404, and a recording medium 405. These components are coupled to one another through a bus 400.

The CPU 401 controls the entirety of the information processor 100. The memory 402 includes, for example, a read-only memory (ROM), a random-access memory (RAM), a flash ROM, and the like. Specifically, for example, the flash ROM and the ROM store various programs, and the RAM is used as a work area of the CPU 401. The program stored in the memory 402 is loaded into the CPU 401, thereby causing the CPU 401 to execute coded processing.

The network I/F 403 is coupled to the network 310 through communication line and is coupled to another computer via the network 310. The network I/F 403 controls the network 310 and an internal interface so as to control data input/output from/to the other computer. The network I/F 403 is, for example, a modem, a LAN adapter, or the like.

The recording medium I/F 404 controls reading/writing of data from/to the recording medium 405 under the control of the CPU 401. The recording medium I/F 404 is, for example, a disk drive, a solid state drive (SSD), a Universal Serial Bus (USB) port, or the like. The recording medium 405 is a nonvolatile memory that stores the data written under the control of the recording medium I/F 404. The recording medium 405 is, for example, a disk, a semiconductor memory, a USB memory, or the like. The recording medium 405 may be detachable from the information processor 100.

In addition to the above-described components, the information processor 100 may include, for example, a keyboard, a mouse, a display, a printer, a scanner, a microphone, a speaker, and the like. The information processor 100 may include multiple recording medium I/Fs 404 or multiple recording media 405. The information processor 100 may not include the recording medium I/F 404 or the recording medium 405.

(Hardware Configuration Example of Client Device 301)

Next, a hardware configuration example of the client device 301 included in the information processing system 300 illustrated in FIG. 2 is described with reference to FIG. 5.

Figure 5:
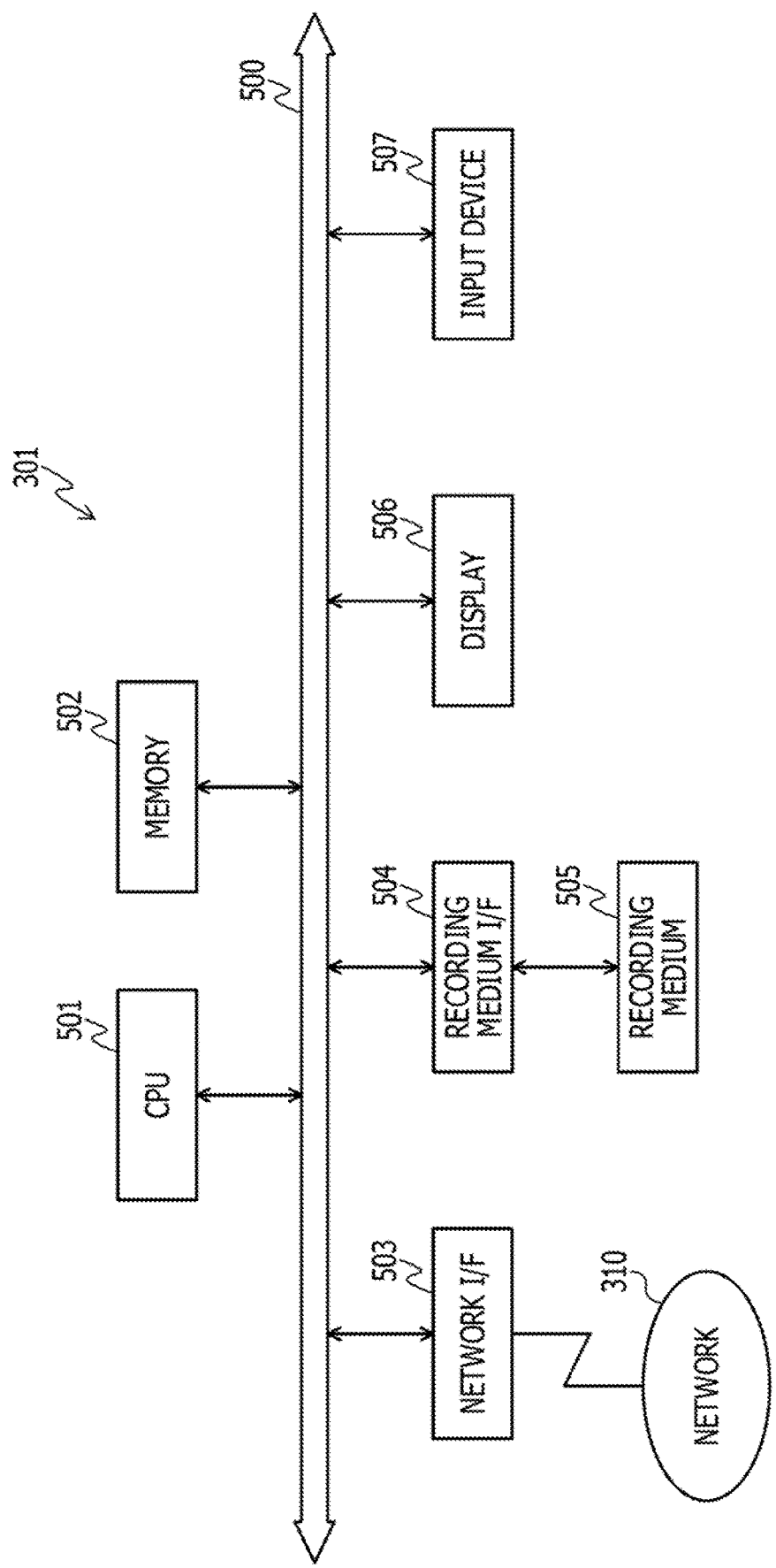
FIG. 5 is a block diagram illustrating a hardware configuration example of a client device 301.

FIG. 5 is a block diagram illustrating the hardware configuration example of the client device 301. In FIG. 5, the client device 301 includes a CPU 501, a memory 502, a network I/F 503, a recording medium I/F 504, a recording medium 505, a display 506, and an input device 507. These components are coupled to one another through a bus 500.

The CPU 501 controls the entirety of the client device 301. The memory 502 includes, for example, a ROM, a RAM, a flash ROM, and the like. Specifically, for example, the flash ROM and the ROM store various programs, and the RAM is used as a work area of the CPU 501. The program stored in the memory 502 is loaded into the CPU 501, thereby causing the CPU 501 to execute coded processing.

The network I/F 503 is coupled to the network 310 through a communication line and is coupled to another computer via the network 310. The network I/F 503 controls the network 310 and an internal interface so as to control data input/output from/to the other computer. The network I/F 503 is, for example, a modem, a LAN adapter, or the like.

The recording medium I/F 504 controls reading/writing of data from/to the recording medium 505 under the control of the CPU 501. The recording medium I/F 504 is, for example, a disk driver, an SSD, a USB port, or the like. The recording medium 505 is a nonvolatile memory that stores the data written under the control of the recording medium I/F 504. The recording medium 505 is, for example, a disk, a semiconductor memory, a USB memory, or the like. The recording medium 505 may be detachable from the client device 301.

The display 506 displays not only a cursor, an icon, and a tool box but also data such as a document, an image, functional information, and so on. The display 506 is, for example, a cathode ray tube (CRT), a liquid crystal display, an organic electroluminescence (EL) display, or the like. The input device 507 includes keys for inputting letters, numbers, various instructions, and the like to input data. The input device 507 may be a keyboard, a mouse, or the like, or may be a touch panel type-input pad, a numeric keypad, or the like.

In addition to the above-described components, the client device 301 may include, for example, a printer, a scanner, a microphone, a speaker, and the like. The client device 301 may include multiple recording medium I/Fs 504 or multiple recording media 505. The client device 301 may not include the recording medium I/F 504 and the recording medium 505.

(Functional Configuration Example of Information Processor 100)

Next, a functional configuration example of the information processor 100 is described with reference to FIG. 6.

Figure 6:
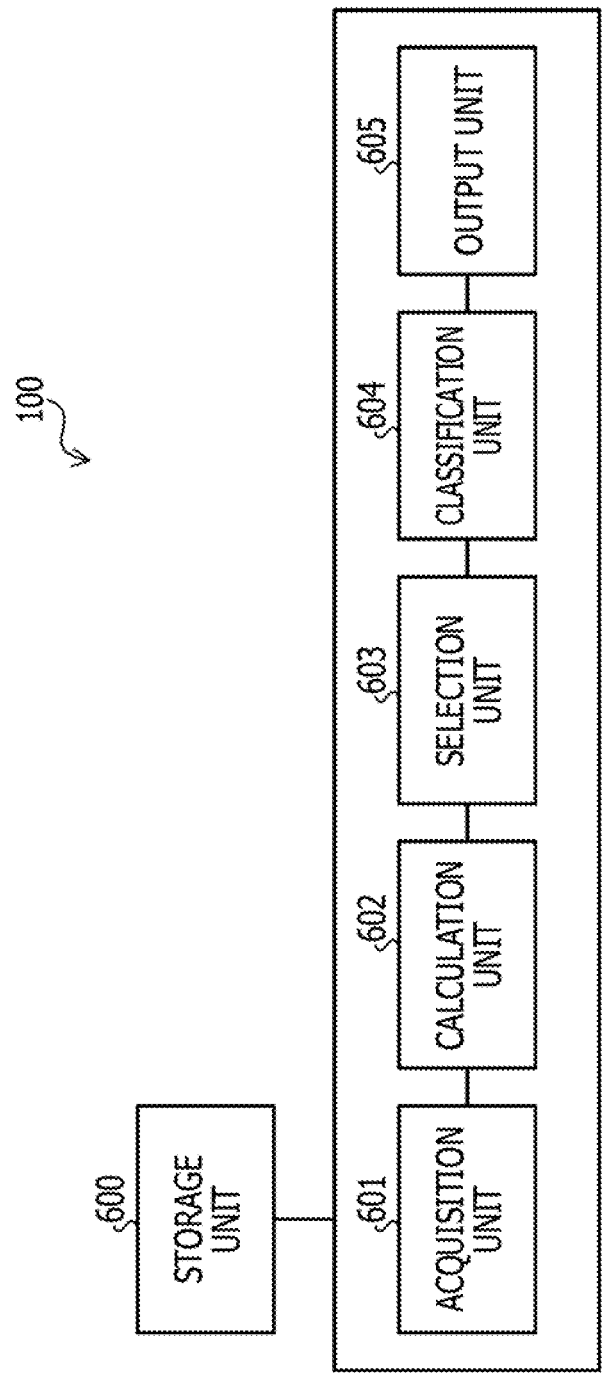
FIG. 6 is a block diagram illustrating a functional configuration example of the information processor 100.

FIG. 6 is a block diagram illustrating a functional configuration example of the information processor 100. The information processor 100 includes a storage unit 600, an acquisition unit 601, a calculation unit 602, a selection unit 603, a classification unit 604, and an output unit 605.

The storage unit 600 is implemented by using, for example, a storage area such as the memory 402 or the recording medium 405 illustrated in FIG. 4. The case where the storage unit 600 is included in the information processor 100 is described below; however, the embodiment is not limited thereto. For example, there may be the case where the storage unit 600 is included in a different device from the information processor 100, and the contents stored in the storage unit 600 are able to be referred through the information processor 100.

The units of the information processor 100 from the acquisition unit 601 to the output unit 605 function as an example of a control unit. Specifically, the functions of the units from the acquisition unit 601 to the output unit 605 are implemented by, for example, causing the CPU 401 to execute a program stored in the storage area such as the memory 402 or the recording medium 405 illustrated in FIG. 4, or by using the network I/F 403. Results of processing performed by the functional units are stored in a storage area such as the memory 402 or the recording medium 405 illustrated in FIG. 4, for example.

The storage unit 600 stores a variety of pieces of information to be referred to or updated in the processing of each functional unit. The storage unit 600 stores a plurality of imaging methods. Here, even when two imaging methods have the same imaging algorithm, if the imaging methods have different variables, the imaging methods may be handled as different types of imaging methods. The storage unit 600 stores a plurality of trained models. The trained model is, for example, a neural network. Here, even when two trained models have the same network topology of the neural network, if the trained models have different parameters, the trained models may be handled as different types of trained models. The storage unit 600 may store the untrained model that is a source of each of the plurality of trained models.

The storage unit 600 stores a first reference image group. The first reference image group is, for example, the noise image group that is hard to be classified using the trained model. The first reference image group may be an optimum image group used to generate the trained model. The first reference image group may be, for example, two types: the noise image group and the optimum image group. The first reference image group may be, for example, one image. The storage unit 600 stores a second reference image group. The second reference image group is, for example, the same image group as the first reference image group. The second reference image group is, for example, the noise image group. The second reference image group may be, for example, one image.

For each of the trained models, when each image in the first reference image group is input to the trained model, the storage unit 600 may store the feature value group output from the trained model. Also, for each of the trained models, when each image in the first reference image group is input to the trained model, the storage unit 600 may store information indicating the distribution of the feature value group output from the trained model in the feature value space. The information indicating the distribution is, for example, an average feature value and a variance of the feature value group.

For each of the trained models, when each image in the second reference image group is input to the reference model corresponding to the trained model, the storage unit 600 may store the feature value group output from the reference model. Also, for each of the trained models, when each image in the second reference image group is input to the reference model corresponding to the trained model, the storage unit 600 may store information indicating the distribution of the feature value group output from the reference model in the feature value space. The information indicating the distribution is, for example, an average feature value and a variance of the feature value group.

The acquisition unit 601 acquires various types of information used in the processes of the functional units. The acquisition unit 601 stores the obtained various types of information in the storage unit 600 or outputs the obtained pieces of information to the functional units. The acquisition unit 601 may output the various types of information stored in advance in the storage unit 600 to the functional units. For example, the acquisition unit 601 acquires various types of information based on an operational input by the user. For example, the acquisition unit 601 may receive the various types of information from a device different from the information processor 100.

The acquisition unit 601 acquires the data group. The data group is used to estimate the imaging method or the trained model. For example, the acquisition unit 601 acquires a data set, and extracts the data group from the data set. The data set is a target to be classified. Thereby, the acquisition unit 601 may estimate a part of the data set rather than the entire data set, reducing throughput.

The acquisition unit 601 acquires a plurality of image groups. The image group may be, for example, one image. The acquisition unit 601 acquires image groups generated by imaging the data group according to the imaging method. The data in the data group may not correspond to the image in the image group one-to-one. For example, two or more pieces of data in the data group may be imaged into one image. Specifically, the acquisition unit 601 accepts designation of the plurality of imaging methods. Then, the acquisition unit 601 images the acquired data group by each of the plurality of designated imaging methods to acquire the plurality of image groups. The acquisition unit 601 may acquire a device for imaging the data group according to each of the plurality of imaging methods to generate the plurality of image groups, without acquiring the data group.

The acquisition unit 601 acquires a plurality of trained models. The acquisition unit 601 may acquire a plurality of combinations of the image group generated by imaging the data group according to the imaging method and the trained model. In this manner, the acquisition unit 601 may acquire the imaging method, the trained model, or the combination of the imaging method and the trained model to be estimated, and the calculation unit 602 may refer to it.

For each of the acquired image groups, the calculation unit 602 acquires the feature value group output when each image in the image group is input to the trained model. The calculation unit 602 calculates the score of the imaging method used to generate the image group, based on the distribution of the feature value group acquired for each image group and the feature value group output when each image in the first reference image group is input to the trained model in the feature value space. Thereby, the calculation unit 602 may calculate the score of the imaging method, which may be an indicator for selecting the suitable imaging method for data set to be classified.

For each of the acquired trained models, the calculation unit 602 acquires the feature value group output when each image in the image group is input to the trained model. The calculation unit 602 calculates the score of the trained model, based on the distribution of the feature value group acquired for each trained model and the feature value group output when each image in the image group is input to the reference model in the feature value space. Thereby, the calculation unit 602 may calculate the score of the trained model, which may be an indicator for selecting the suitable trained model for the data set to be classified.

For each of the acquired combinations, the calculation unit 602 acquires the feature value group output when each image in the image group in the combination is input to the trained model in the combination. The calculation unit 602 calculates the score of the imaging method used to generate the image group in the combination, based on the distribution of the feature value group acquired for each combination and the feature value group output when the each image in the first reference image group is input to the trained model in the combination in the feature value space. Thereby, the calculation unit 602 may calculate the score of the imaging method used to generate the image group in the combination, which may be an indicator for selecting the suitable combination for the data set to be classified.

For each of the acquired combinations, the calculation unit 602 acquires the feature value group output when each image in the image group in the combination is input to the trained model in the combination. The calculation unit 602 calculates the score of the trained model in the combination, based on the distribution of the feature value group acquired for each combination and the feature value group output when each image in the image group in the combination is input to the reference model in the combination in the feature value space. Thereby, the calculation unit 602 may calculate the score of the trained model in the combination, which may be an indicator for selecting the suitable combination for the data set to be classified.

For each of the acquired combinations, the calculation unit 602 may further calculate the score of the trained model, based on the distribution of the feature value group input when each image in the second reference image group is input to the reference model in the feature value space. Thereby, the calculation unit 602 may improve the calculation accuracy of the score of the trained model.

The selection unit 603 selects any of the plurality of acquired imaging methods, based on the score of the imaging method, which is calculated for each of the imaging methods. The selection unit 603 selects, for example, the imaging method having the highest score. The selection unit 603 may select, for example, top M imaging methods in terms of score. Thereby, the selection unit 603 may select the suitable imaging method for the data set to be classified.

The selection unit 603 selects any of the plurality of acquired trained models, based on the score of the trained model, which is calculated for each of the trained models. The selection unit 603 selects, for example, the trained model having the highest score. The selection unit 603 may select, for example, top M trained models terms of score. Thereby, the selection unit 603 may select the suitable trained model for the data set to be classified.

The selection unit 603 selects any of the plurality of acquired combinations, based on the score of the imaging method and the score of the trained model, which are calculated for each of the combinations. The selection unit 603 selects the combination having the highest sum of the score of the imaging method and the score of the trained model. The selection unit 603 may select, for example, top M combinations in terms of the sum of the score of the imaging method and the score of the trained model. Thereby, the selection unit 603 may select the suitable combination for the data set to be classified.

The classification unit 604 classifies the data group, based on the feature value group output when each image in the image group generated by imaging the data group using the selected imaging method is input to the trained model. Thereby, the classification unit 604 may accurately classify the data group.

The classification unit 604 classifies the data set, based on a feature value set output when each image in an image set generated by imaging the data set using the selected imaging method is input to the trained model. Thereby, the classification unit 604 may accurately classify the data set.

The classification unit 604 classifies the data group, based on the feature value group output when each image in the image group generated by imaging the data group is input to the selected trained model. Thereby, the classification unit 604 may accurately classify the data group.

The classification unit 604 classifies the data set, based on the feature value set output when each image in the image set generated by imaging the data set is input to the selected trained model. Thereby, the classification unit 604 may accurately classify the data set.

The classification unit 604 classifies the data group, based on the feature value group output when each image in the image group generated by aging the data group according to the imaging method used to generate the image group in the selected combination is input to the trained model in the selected combination. Thereby, the classification unit 604 may accurately classify the data group.

The classification unit 604 classifies the data set, based on the feature value set output when each image in the image set generated by imaging the data set according to the imaging method used to generate the image group in the selected combination is input to the trained model in the selected combination. Thereby, the classification unit 604 may accurately classify the data set.

The output unit 605 outputs various information. The output is made by, for example, displaying on a display, outputting to a printer for printing, transmitting to an external device by the network I/F 403, and storing in a storage area such as the memory 402 or the recording medium 405.

The output unit 605 outputs, for example, the score of the imaging method, which is calculated for each of the image groups. Thereby, the output unit 605 may facilitate the classification operator to refer to the score and recognize which of the plurality of imaging methods is the suitable imaging method for the classification target. Accordingly, the output unit 605 enables the classification operator to accurately classify the classification target, reducing operation loads of the classification operator.

The output unit 505 outputs, for example, the score of the trained model, which is calculated for each of the trained models. Thereby, the output unit 605 may facilitate the classification operator to refer to the score and recognize which of the plurality of trained models is the suitable trained model for the classification target. Accordingly, the output unit 605 enables the classification operator to accurately classify the classification target, reducing operation loads of the classification operator.

The output unit 505 outputs, for example, the score of the imaging method and the score of the trained model, which are calculated for each of the combinations. Thereby, the output unit 605 may facilitate the classification operator to refer to the score and recognize which of the plurality of imaging methods is the suitable imaging method for the classification target. The output unit 605 may also facilitate the classification operator to refer to the scores and recognize which of the plurality of imaging methods is the suitable imaging method for the classification target. Accordingly, the output unit 605 enables the classification operator to accurately classify the classification target, reducing operation loads of the classification operator.

The output unit 605 associates the imaging method used to generate the image group in the selected combination with the trained model in the selected combination, and outputs them. Thereby, the output unit 605 may facilitate the classification operator to recognize which combination of the imaging method and the imaging method is suitable for the classification target. Accordingly, the output unit 605 enables the classification operator to accurately classify the classification target, reducing operation loads of the classification operator.

The output unit 605 outputs a classification result. Thereby, the output unit 605 may reduce operation loads of the classification operator. The output unit 605 may outputs a processing result of any functional unit. Thereby, the output unit 605 may inform the processing result of each functional unit to the user to facilitate the user to recognize processing contents of each functional unit, improving the convenience of the information processor 100, (Operation Example of Information Processor 100)

Next, an operation example of the information processor 100 is described with reference to FIGS. 7 to 15. First, referring to FIG. 7, an example in which the information processor 100 samples a data group to be analyzed to extract a data group to be estimated is described. The data group to be analyzed is, for example, time series data.

Figure 7:
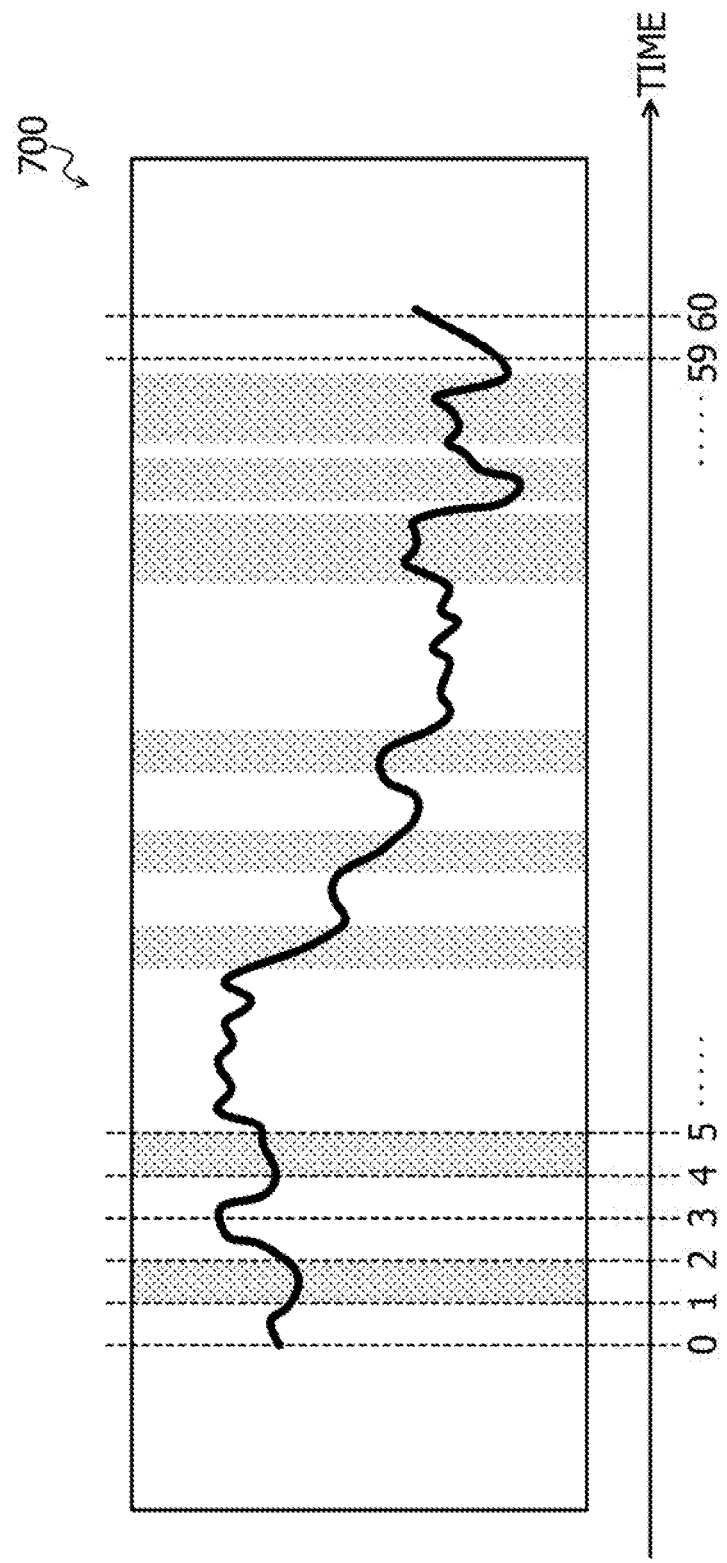
FIG. 7 is an explanatory diagram illustrating an example of sampling.

FIG. 7 is an explanatory diagram illustrating the example of sampling. In FIG. 7, the information processor 100 acquires time series data 700. The time series data 700 is a data set that corresponds to a data group to be classified and includes plural pieces of data at respective times. The information processor 100 samples the time series data 700 to extract the data group to be estimated. For example, the sampling means that data in units of W seconds is randomly extracted from the time series data 700 by 1/N of the time series data 700. The units of W seconds corresponds to imaging unit, for example.

Figure 8:
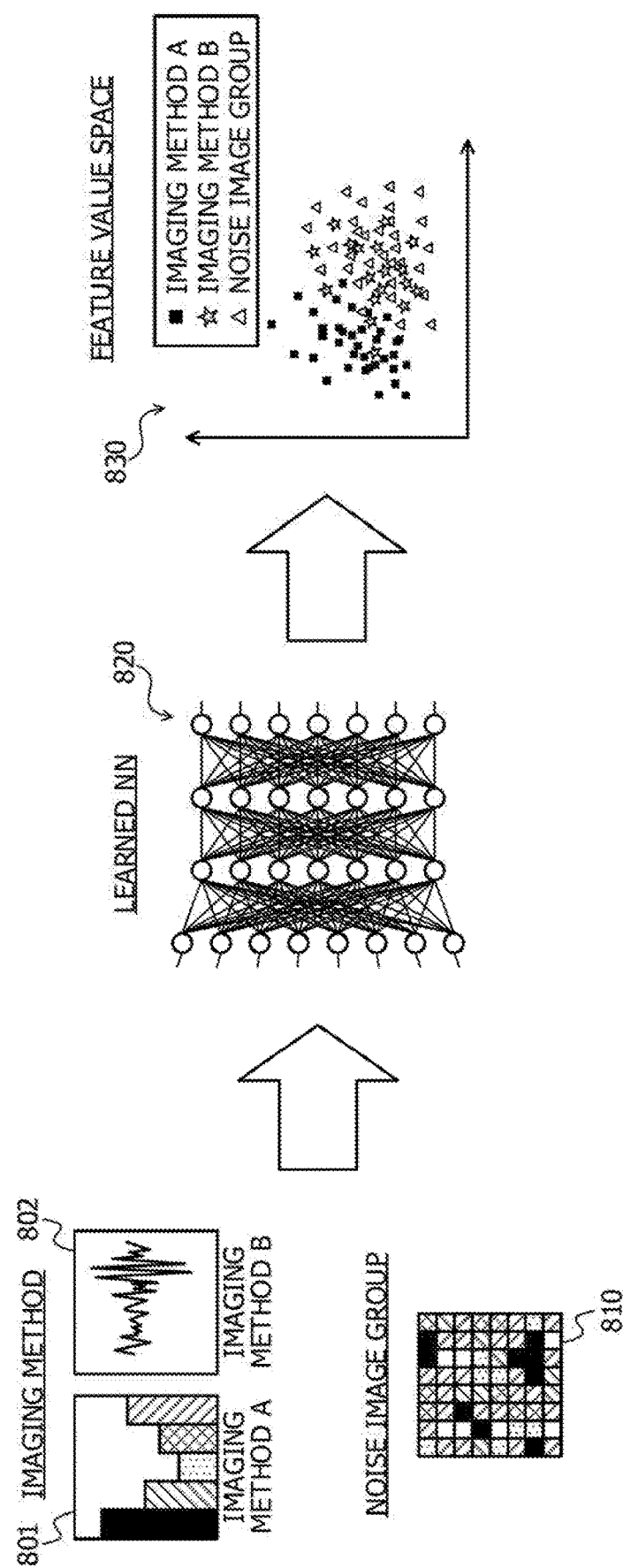
FIG. 8 is an explanatory diagram illustrating an example of estimation of an imaging method.
Figure 9:
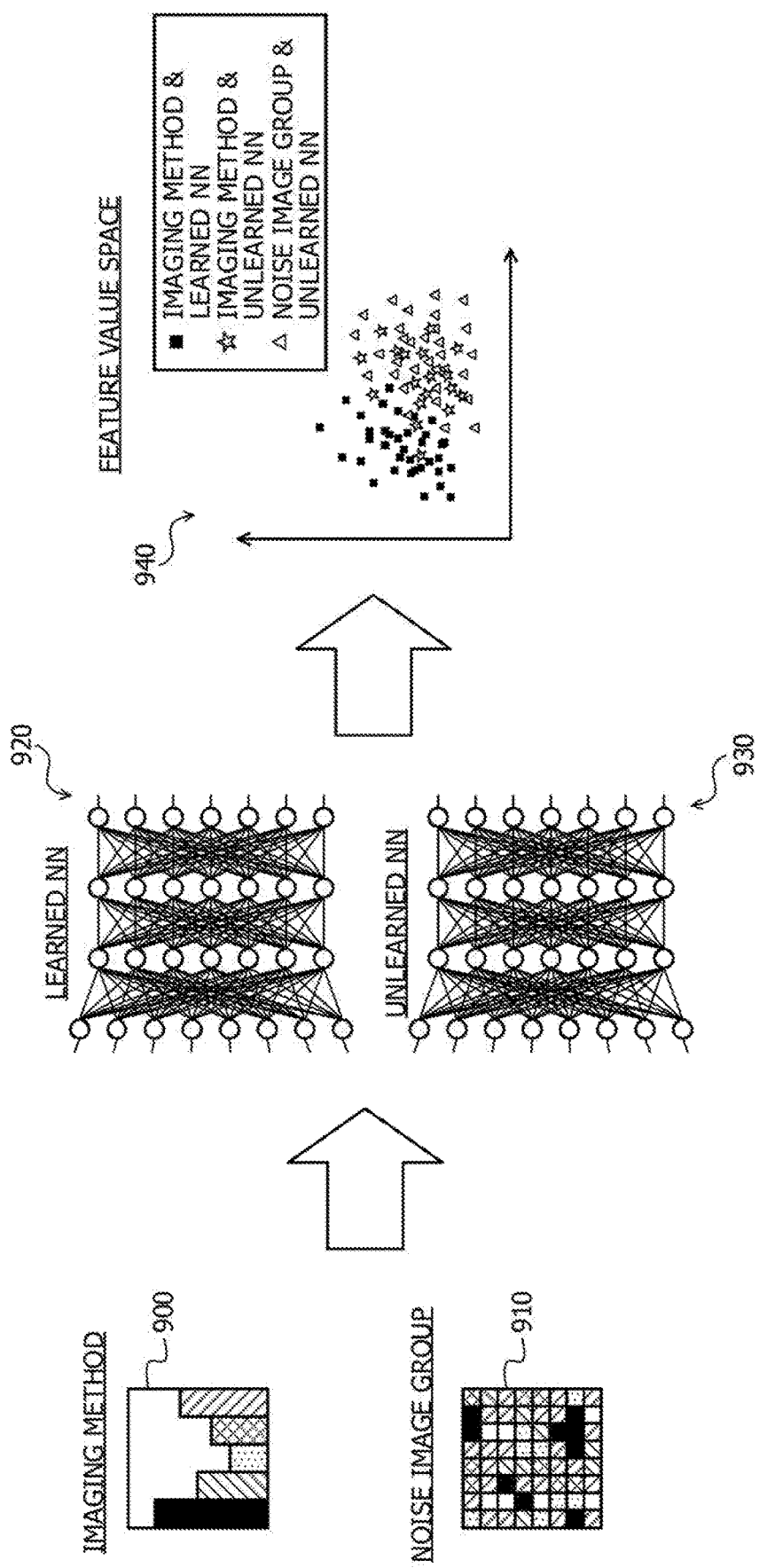
FIG. 9 is an explanatory diagram illustrating an example of estimation of a trained NN.

In the example illustrated in FIG. 7, the information processor 100 extracts data in units of one minute in a shaded region from the time series data 700 for one hour by ⅙ of the time series data 700 to extract the data group to be estimated. In this manner, the information processor 100 may generate the smaller data group to be estimated than the time series data 700 without remaining the time series data 700 as the data group to be estimated, thereby reducing throughput. Referring to FIGS. 8 and 9, an example in which the information processor 100 estimates the imaging method and a trained NN (may be referred to as "learned NN") will be described below.

FIG. 8 is an explanatory diagram illustrating the example of the imaging method. In FIG. 8, the information processor 100 estimates an imaging method A and an imaging method B.

For example, the information processor 100 inputs each image in an image group 801 acquired by imaging the data group to be estimated according to the imaging method A to a trained NN 820, and acquires the feature value group corresponding to the imaging method A. For example, the information processor 100 inputs each image in an image group 802 acquired by imaging the data group to be estimated according to the imaging method B to the trained NN 820, and acquires the feature value group corresponding to the imaging method B.

The information processor 100 also inputs each image in a noise image group 810 to the trained NN 820, and acquires the feature value group corresponding to the noise image group. Here, the distribution of the feature value group corresponding to the noise image group may be a sample in the case of a failure of classification of the data group to be estimated.

Thus, the information processor 100 identifies how the distribution of the feature value group corresponding to the imaging method A and the distribution of the feature value group corresponding to the imaging method B are remote from the distribution of the feature value group corresponding to the noise image group in feature value space 830. Since the distribution of the feature value group corresponding to the imaging method A is more remote from the distribution of the feature value group corresponding to the noise image group than the distribution of the feature value group corresponding to the imaging method B, the information processor 100 estimates that the imaging method A is more suitable for classification processing of the data group to be analyzed than the imaging method B.

Specifically, the information processor 100 calculates the score indicating the suitability of the imaging method for the classification processing of the data group to be analyzed, depending on the remoteness of the distribution of the feature value group corresponding to the imaging method from the distribution of the feature value group corresponding to the noise image group. The information processor 100 estimates the imaging method, based on the score of the imaging method. A specific example of calculation of the score of the imaging method will be described later with reference to FIGS. 10 to 14, for example. Referring to FIG. 9, an example in which the information processor 100 estimates the trained NN estimates will be described below.

FIG. 9 is an explanatory diagram illustrating the example of the estimation of the trained NN. In FIG. 9, the information processor 100 estimates a trained NN 920 in the combination of any imaging method and the trained NN 920.

For example, the information processor 100 inputs each image in an image group 900 acquired by imaging the data group to be estimated to the trained NN 920, and acquires the feature value group corresponding to the combination of the imaging method and the trained NN 920. For example, the information processor 100 inputs each image in the image group 900 acquired by imaging the data group to be estimated to an untrained NN 930, and acquires the feature value group corresponding to the combination of the imaging method and the untrained NN 930.

The information processor 100 also inputs each image in a noise image group 910 to the untrained NN 930, and acquires the feature value group corresponding to the combination of the noise image group 910 and the untrained NN 930. Here, the distribution of the feature value group corresponding to the combination of the noise image group 910 and the untrained NN 930 may be a sample in the case of a failure of classification of the data group to be estimated. The distribution of the feature value group corresponding to the combination of the imaging method and the untrained NN 930 may be a sample in the case of low classification accuracy of the data group to be estimated.

Thus, the information processor 100 sets the remoteness of the distribution of the feature value group corresponding to the combination of the imaging method and the untrained NN 930 from the distribution of the feature value group corresponding to the combination of the noise image group 910 and the untrained NN 930 in a feature value space 940, as an estimation reference. The information processor 100 also sets the remoteness of the distribution of the feature value group corresponding to the combination of the imaging method and the trained NN 920 from the distribution of the feature value group corresponding to the combination of the noise image group 910 and the untrained NN 930, as an estimation target. The information processor 100 estimates that as the remoteness of the estimation target is larger than the remoteness of the estimation reference, the trained NN 920 is more suitable for the classification processing of the data group to be analyzed.

Specifically, the information processor 100 calculates the score indicating the suitability of the trained NN 920 for the classification processing of the data group to be analyzed, depending on the remoteness of the estimation target and the remoteness of the estimation reference. Here, the remoteness of the estimation reference corresponds to a score 1. The information processor 100 estimates the trained NN 920, based on the score of the trained NN 920. A specific example of the calculation of the score of the trained NN 920 will be described later with reference to FIGS. 10 to 14, for example. Referring to FIGS. 10 to 14, the specific example in which the information processor 100 calculates the score of the imaging method and the score of the trained NN will be described below.

Figure 10:
FIG. 10 is an explanatory diagram illustrating an example of creation of a distribution table 1000.

FIG. 10 is an explanatory diagram illustrating an example of creation of the distribution table 1000. In FIG. 10, the information processor 100 creates the distribution table 1000 that sets information indicating the distribution of various feature value groups in the feature value space therein. The information indicating the distribution is, for example, average feature value or variance.

In the example illustrated in FIG. 10, the information processor 100 includes the imaging method A and the imaging method B, a trained NN-a and an untrained NN-a corresponding to the trained NN-a, and a trained NN-b and an untrained NN-b corresponding to the trained NW-b. The untrained NW-a has the same network topology as that of the trained NN-a and initialized parameters. The untrained NN-b has the same network topology as that of the trained NN-b and initialized parameters. The information processor 100 also has a noise image group, a learning image group used to learn the trained NN-a from the untrained NN-a, and a learning image group used to learn the trained NN-b from the untrained NN-b.

In the example illustrated in FIG. 10, the information processor 100 generates information $B_{0a}$ indicating the distribution of the feature value group output from the untrained NN-a when each image in the noise image group is input to the untrained NN-a, and sets the information $B_{0a}$ in the distribution table 1000. Thereby, the information processor 100 may represent the information $B_{0a}$ indicating the distribution of the feature values, which ay be a sample of a failure of classification using the untrained NN-a.

The information processor 100 also generates information $B_{1a}$ indicating the distribution of the feature value group output from the trained NN-a when each image in the noise image group is input to the trained NN-a, and sets the information $B_{1a}$ in the distribution table 1000. Thereby, the information processor 100 may represent the information $B_{1a}$ indicating the distribution of the feature values, which may be a sample of a failure of classification using the trained NN-a.

The information processor 100 also generates information $B_{0b}$ indicating the distribution of the feature value group output from the untrained NN-b when each image in the noise image group is input to the untrained NN-b, and sets the information $B_{0b}$ in the distribution table 1000. Thereby, the information processor 100 may represent the information $B_{0b}$ indicating the distribution of the feature values, which may be a sample of a failure of classification using the untrained NN-b.

The information processor 100 also generates information $B_{1b}$ indicating the distribution of the feature value group output from the trained NN-b when each image in the noise image group is input to the trained NN-b, and sets the information $B_{1b}$ in the distribution table 1000. Thereby, the information processor 100 may represent the information $B_{1b}$ indicating the distribution of the feature values, which may be a sample of a failure of classification using the trained NN-b.

The information processor 100 also generates information $X_{A,0a}$ indicating the distribution of the feature value group output from the untrained NN-a when each image in the image group generated from the data group to be estimated according to the imaging method A is input to the untrained NN-a, and sets the information $X_{A,0a}$ in the distribution table 1000. Thereby, the information processor 100 may represent the information $X_{A,0a}$ indicating the distribution of the feature values, which may be a sample in the case where the classification accuracy using the untrained NN-a is relatively low.

The information processor 100 also generates information $X_{A,1a}$ indicating the distribution of the feature value group output from the trained NN-a when each image in the image group generated from the data group to be estimated according to the imaging method A is input to the trained NN-a, and sets the information $X_{A,1a}$ in the distribution table 1000. Thereby, the information processor 100 may represent the information $X_{A,1a}$ indicating the distribution of the feature values, which may be an indicator indicating the level of the classification accuracy using the combination of the imaging method A and the trained NN-a.

The information processor 100 also generates information $X_{A,0b}$ indicating the distribution of the feature value group output from the untrained NN-b when each image in the image group generated from the data group to be estimated according to the imaging method A is input to the untrained NN-b, and sets the information $X_{A,0b}$ in the distribution table 1000. Thereby, the information processor 100 may represent the information $X_{A,0b}$ indicating the distribution of the feature values, which may be a sample in the case where the classification accuracy using the untrained NN-b is relatively low.

The information processor 100 also generates information $X_{A,1b}$ indicating the distribution of the feature value group output from the trained NN-b when each image in the image group generated from the data group to be estimated according to the imaging method A is input to the trained NN-b, and sets the information $X_{A,1b}$ in the distribution table 1000. Thereby, the information processor 100 may represent the information $X_{A,1b}$ indicating the distribution of the feature values, which may be an indicator indicating the level of the classification accuracy using the combination of the imaging method A and the trained NN-b.

The information processor 100 also generates information $X_{B,0a}$ indicating the distribution of the feature value group output from the untrained NN-a when each image in the image group generated from the data group to be estimated according to the imaging method B is input to the untrained NN-a, and sets the information $X_{B,0a}$ in the distribution table 1000. Thereby, the information processor 100 may represent the information $X_{B,0a}$ indicating the distribution of the feature values, which may be a sample in the case where the classification accuracy using the untrained NN-a is relatively low.

The information processor 100 also generates information $X_{B,1a}$ indicating the distribution of the feature value group output from the trained NN-a when each image in the image group generated from the data group to be estimated according to the imaging method B is input to the trained NN-a, and sets the information $X_{B,1a}$ in the distribution table 1000. Thereby, the information processor 100 may represent the information $X_{B,1a}$ indicating the distribution of the feature values, which may be an indicator indicating the level of the classification accuracy using the combination of the imaging method B and the trained NN-a.

The information processor 100 also generates information $X_{B,0b}$ indicating the distribution of the feature value group output from the untrained NN-b when each image in the image group generated from the data group to be estimated according to the imaging method B is input to the untrained NN-b, and sets the information $X_{B,0b}$ in the distribution table 1000. Thereby, the information processor 100 may represent the information $X_{B,0b}$ indicating the distribution of the feature values, which may be a sample in the case where the classification accuracy using the untrained NN-b is relatively low.

The information processor 100 also generates information $X_{B,1b}$ indicating the distribution of the feature value group output from the trained NN-b when each image in the image group generated from the data group to be estimated according to the imaging method B is input to the trained NN-b, and sets the information $X_{B,1b}$ in the distribution table 1000. Thereby, the information processor 100 may represent the information $X_{B,1b}$ indicating the distribution of the feature values, which may be an indicator indicating the level of the classification accuracy using the combination of the imaging method B and the trained NN-b.

The information processor 100 also generates information $G_{1a}$ indicating the distribution of the feature value group output from the trained NN-a when each image in the learning image group is input to the trained NN-a, and sets the information $G_{1a}$ in the distribution table 1000. Thereby, the information processor 100 may represent the information $G_{1a}$ indicating the distribution of the feature values, which may be a sample in the case where the classification accuracy using the trained NN-a is relatively high.

The information processor 100 also generates information $G_{1b}$ indicating the distribution of the feature value group output from the trained NN-b when each image in the learning image group is input to the trained NN-b, and sets the information $G_{1b}$ in the distribution table 1000. Thereby, the information processor 100 may represent the information $G_{1b}$ indicating the distribution of the feature values, which may be a sample in the case where the classification accuracy using the trained NN-b is relatively high.

In following description, the distribution of the feature value group corresponding to the combination of the noise image group and an untrained NN-k may be represented as "least accurate distribution 0k". k is a variable, and a or b. Further, the distribution of the feature value group corresponding to the combination of the noise image group and a trained NN-k may be represented as "least accurate distribution 1k". Further, the distribution of the feature value group corresponding to the combination of learning image group and the trained NN-k may be represented as "most accurate distribution 1k".

Figure 11:
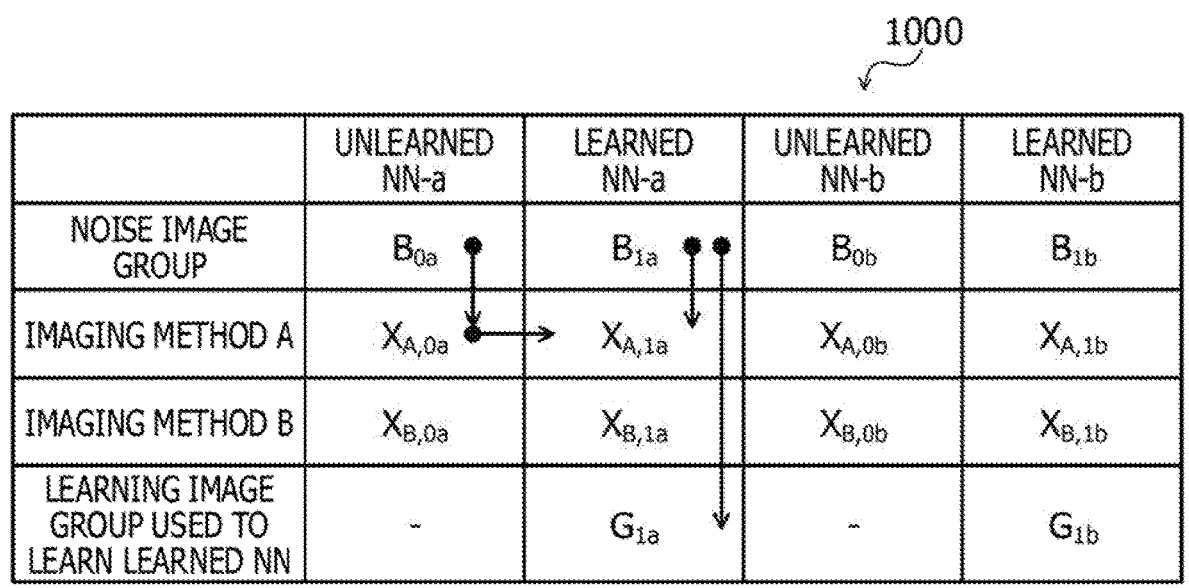
FIG. 11 is an explanatory diagram illustrating an example of calculation of the score of the imaging method and the score of the leaned NN.

The information processor 100 sets the scores of the imaging method and the trained NN-k to be higher as the distribution of the feature value group corresponding to the combination of the imaging method and the trained NN-k is further from the least accurate distribution 0k and the least accurate distribution 1k, and is closer to the most accurate distribution 1k. Referring to FIG. 11, an example in which the information processor 100 refers to the distribution table 1000 to calculate the score of the imaging method and the trained NN will be described below.

FIG. 11 is an explanatory diagram illustrating the example of calculation of the score of the imaging method and the score of the trained NN. In the example illustrated in FIG. 11, the information processor 100 adds a label (i) to the imaging method, and a label (n) to the trained model.

The information processor 100 calculates a score $T_{i,n}$ of the imaging method (i) in the combination of the imaging method (i) and trained NN (n) according to a below-mentioned equation (1). The below-mentioned equation (1) normalizes the distance between the least accurate distribution 1k and the most accurate distribution 1k as 1, and estimates the remoteness of the distribution of the feature values corresponding to the combination of the imaging method (i) and the trained NN (n) from the least accurate distribution 1k. According to the below-mentioned equation (1), as the remoteness is higher, the score $T_{i,n}$ is higher. Further, due to the normalization, even when the number of dimensions of the feature value space varies, the score $T_{i,n}$ may be calculated. Thereby, the information processor 100 may estimate how the imaging method (i) contributes to an improvement in classification accuracy as compared to another imaging method (i') in the combination of the imaging method (i) and the trained NN (n), and calculates the contribution as the score $T_{i,n}$. Wherein, $i' \neq i$.

$$T_{i,n} = \frac{\|X_{i,1n} - B_{1n}\|}{\|G_{1n} - B_{1n}\|} \quad (1)$$

The information processor 100 calculates a score $S_{i,n}$ of the trained NN (n) in the combination of the imaging method (i) and the trained NN (n) according to a below-mentioned equation (2). The below-mentioned equation (2) normalizes the distance between the least accurate distribution 0k and the least accurate distribution 1k as 1, and estimates the remoteness of the distribution of the feature values corresponding to the combination of the imaging method (i) and the trained NN (n) from the least accurate distribution 1k. According to the below-mentioned equation (2), as the remoteness is higher, the score $S_{i,n}$ is higher. In addition, due to the normalization, even when the number of dimensions of the feature value space varies, the score $S_{i,n}$ may be calculated. Thereby, the information processor 100 may estimate how the trained NN (n) contributes to an improvement in classification accuracy as compared to another trained NN (n') in the combination of the imaging method (i) and the trained NN (n), and calculate the contribution as the score $S_{i,n}$. Wherein, n'≠n.

$$S_{i,n} = \frac{\|X_{i,0n} - X_{i,1n}\|}{\|X_{i,0n} - B_{0n}\|} \quad (2)$$

The information processor 100 calculates a sum of the score $T_{i,n}$ and the score $S_{i,n}$, and acquires an optimum combination score in the combination of the imaging method (i) and the trained NN (n). Then, the information processor 100 selects the combination of the imaging method (i) and the trained NN (n) resulting in the maximum optimum combination score according to a below-mentioned equation (3).

$$\{i,n\} = \max\{S_{i,n} + T_{i,n} | i,n\} \quad (3)$$

Figure 13:
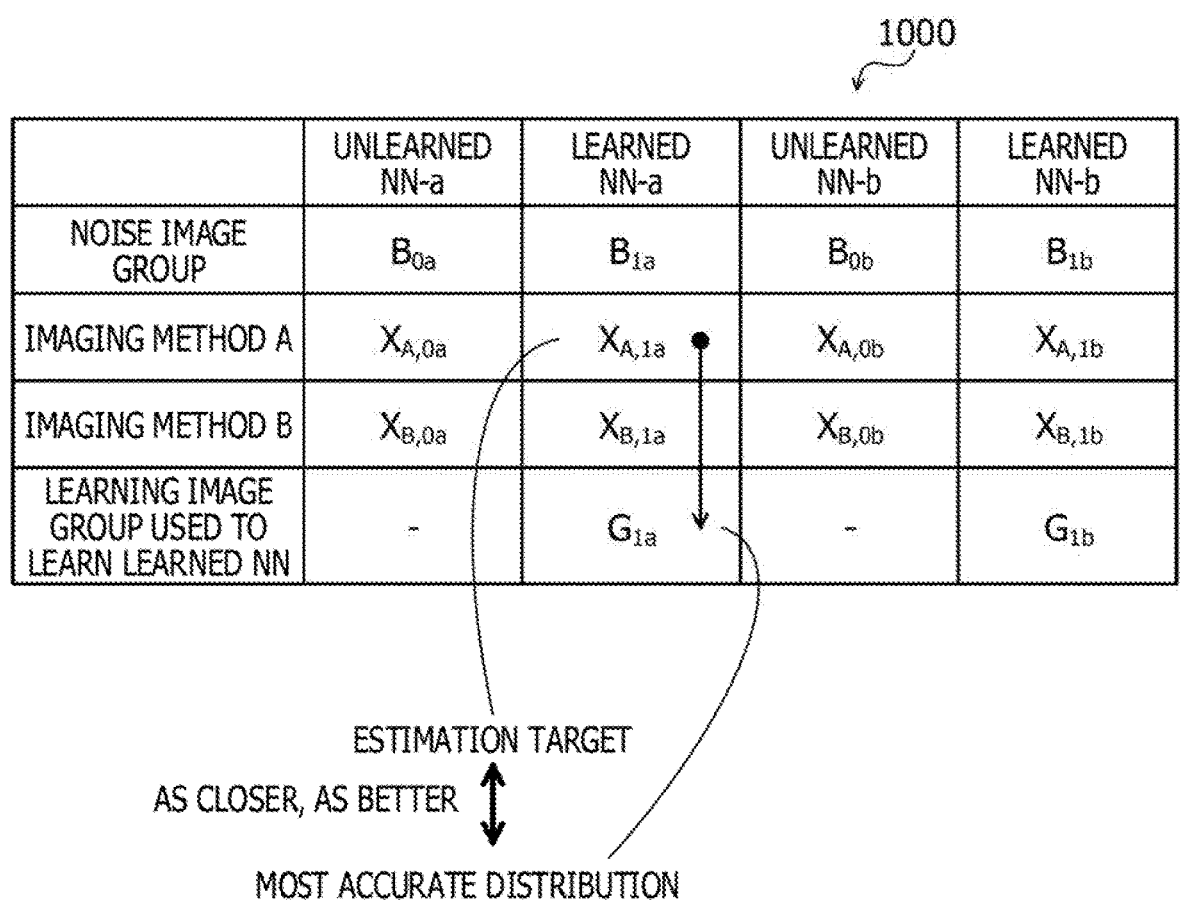
FIG. 13 is an explanatory diagram (2) illustrating another example of calculation of the score of the imaging method.

Thereby, the information processor 100 may examine which combination of the imaging method (i) and the trained NN (n) is suitable for the data group to be estimated with a relatively small operation amount. Then, the information processor 100 may facilitate the classification operator to recognize which combination of the imaging method (i) and the trained NN (n) is suitable for the data group to be estimated. Thus, the information processor 100 may reduce operation loads of the classification operator. Referring to FIGS. 12 and 13, another example in which the information processor 100 refers to the distribution table 1000 to calculate the score of the imaging method will be described below.

FIGS. 12 and 13 are explanatory diagrams illustrating another example of calculation of the score of the imaging method. As illustrated in FIG. 12, the information processor 100 may calculate the score $T_{i,n}$ of the imaging method (i) in the combination of the imaging method (i) and the trained NN (n) according to a below-mentioned equation (4) in place of the above-mentioned equation (1). The below-mentioned equation (4) may estimate the remoteness of the distribution of the feature values corresponding to the combination of the imaging method (i) and the trained NN (n) from the least accurate distribution 1k. According to the below-mentioned equation (4), as the remoteness is higher, the score $T_{i,n}$ becomes higher.

$$T_{i,n} = \frac{1}{\|G_{1n} - X_{i,1n}\|} \quad (4)$$

Thereby, the information processor 100 may estimate how the imaging method (i) contributes to an improvement in classification accuracy as compared to another imaging method (i') in the combination of the imaging method (i) and the trained NN (n), and calculates the contribution as the score $T_{i,n}$. In the example illustrated in FIG. 12, since the information processor 100 does not use information $G_{1k}$ indicating the most accurate distribution 1k, throughput and memory usage may be reduced without calculating the information $G_{1k}$ indicating the most accurate distribution 1k in FIG. 10. Next, description continues with reference to FIG. 13.

As illustrated in FIG. 13, the information processor 100 may calculate the score $T_{i,n}$ of the imaging method (i) in the combination of the imaging method (i) and the trained NN (n) according to a below-mentioned equation (5) in place of the above-mentioned equation (1). The below-mentioned equation (5) estimates the proximity of the distribution to the feature value corresponding to the combination of the imaging method (i) and the trained NN (n) to the most accurate distribution 1k. According to the below-mentioned equation (5), as the proximity is higher, the score $T_{i,n}$ becomes higher.

$$T_{i,n} = \|X_{i,1n} - B_{1n}\| \quad (5)$$

Thereby, the information processor 100 may estimate how the imaging method (i) contributes to an improvement in classification accuracy as compared to another imaging method (i') in the combination of the imaging method (i) and the trained NN (n), and calculates the contribution as the score $T_{i,n}$. In the example illustrated in FIG. 13, since the information processor 100 does not use information $B_{1k}$ indicating the least accurate distribution 1k, throughput and memory usage may be reduced without calculating the information $B_{1k}$ indicating the least accurate distribution 1k in FIG. 10. Referring to FIG. 14, another example of the calculation of the score of the trained NN will be described below.

FIG. 14 is an explanatory diagram illustrating another example of calculation of the score of the trained NN. As illustrated in FIG. 14, the information processor 100 may calculate the score $S_{i,n}$ of the trained NN (n) in the combination of the imaging method (i) and the trained NN (n) according to a below-mentioned equation (6) in place of the above-mentioned equation (2). The below-mentioned equation (6) estimates the remoteness of the distribution of the feature values in the combination of the imaging method (i) and the trained NN (n) from the least accurate distribution 1k. According to the below-mentioned equation (6), as the remoteness is higher, the score $S_{i,n}$ becomes higher.

$$S_{i,n} = \|X_{i,0n} - X_{i,1n}\| \quad (6)$$

Thereby, the information processor 100 may estimate how the trained NN (n) contributes to an improvement in classification accuracy as compared to another trained NN (n') in the combination of the imaging method (i) and the trained NN (n), and calculate the contribution as the score $S_{i,n}$. In the example illustrated in FIG. 14, since the information processor 100 does not use information $B_{0k}$ indicating the least accurate distribution 0k, throughput and memory usage may be reduced without calculating the information $B_{0k}$ indicating the least accurate distribution 0k in FIG. 10. Next, effects obtained by the information processor 100 will be described with reference to FIG. 15.

Figure 15:
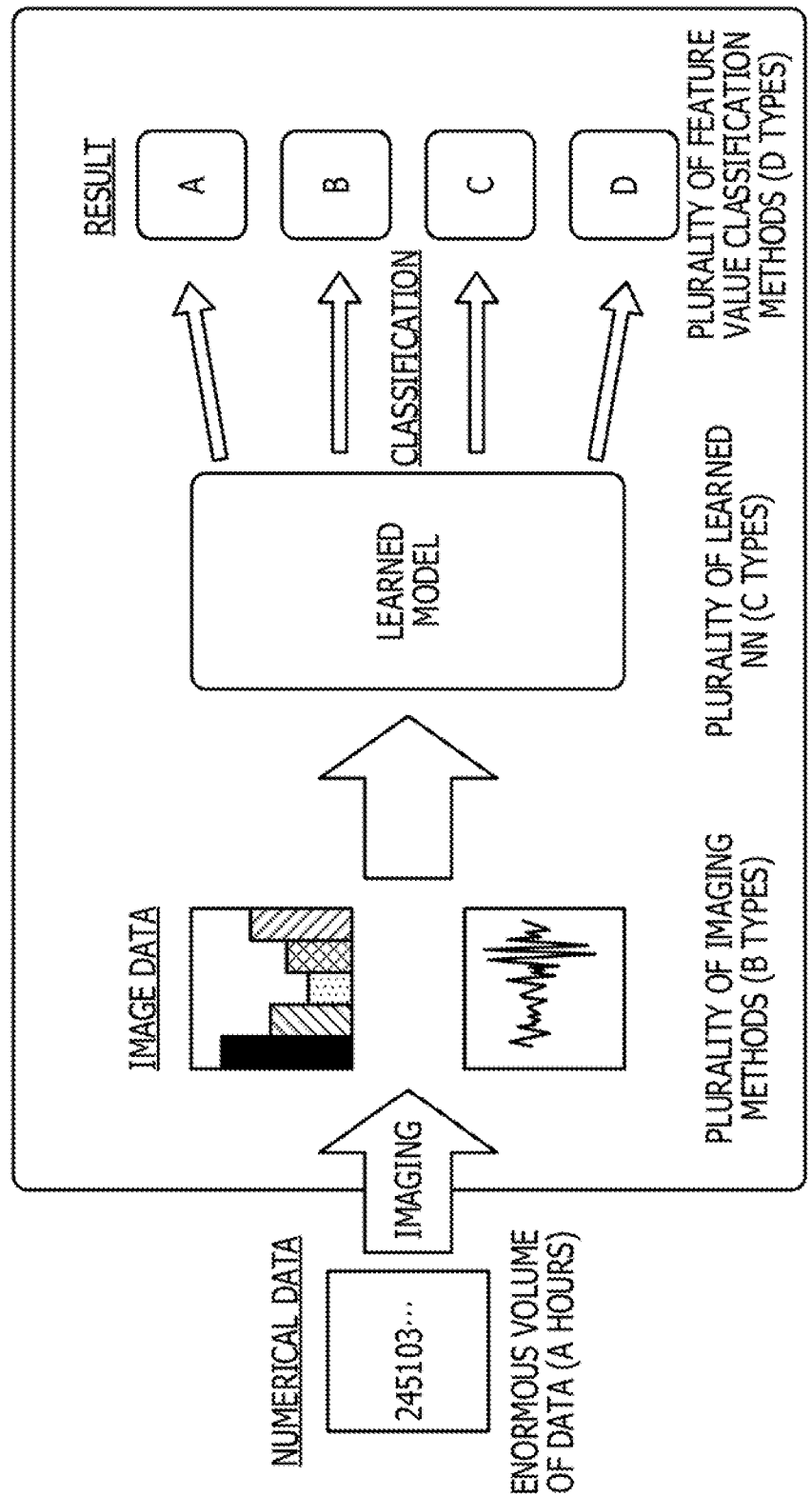
FIG. 15 is an explanatory diagram illustrating effects of the information processor 100.

FIG. 15 is an explanatory diagram illustrating effects of the information processor 100. In the example illustrated in FIG. 15, the information processor 100 classifies numerical data for A hours, and B types of imaging methods, C types of trained NN, and D types of feature value classification method are present, wherein each of B, C, and D is an integer value. Here, data in unit of one minute in the numerical data for A hours is imaged. It is assumed that it takes one second to image the data in unit of one minute, acquire feature values using any trained NN, and classify the data.

According to the prior art, the numerical data for A hours, the B types of imaging methods, the C types of trained NN, and the D types of feature value classification methods are exhaustively combined to examine any combination achieving high classification accuracy. According to this technique, the total required time is as much as (A/60)*B*C*D seconds, leading to an increase in operation loads of the classification operator.

On the contrary, the information processor 100 uses estimation data acquired by sampling the numerical data for A hours by 1/N to examine any suitable combination of the imaging method and the trained NN. Then, the information processor 100 uses the suitable combination to examine the combination of the numerical data for A hours and the D types of feature value classification method. Accordingly, the information processor 100 may reduce the total required time to (A/60/N)*B*C seconds+A/60*D seconds=(A/60)(B*C+D*N)/N seconds. In other words, the information processor 100 may reduce the total required time by (B*C+D*N)/(B*C*D*N) than prior art.

For example, in the case of B=C=D=N=10, the information processor 100 may reduce the total required time to 1/50. In the information processor 100, N is 1 and therefore, the total required time may be reduced to 1/10 without performing sampling. For this reason, the information processor 100 may improve the numerical data classification accuracy while reducing operation time and operation loads of the classification operator. In prior art, for example, when a new classification model suited for numerical data is created, millions of images may be required. On the contrary, the information processor 100 may examine a suitable combination of the imaging method and the trained NN by preparing only hundreds of images. For this reason, the information processor 100 may reduce operation time and operation loads of the classification operator.

(Usage Example 1 of Information Processor 100)

Figure 16:
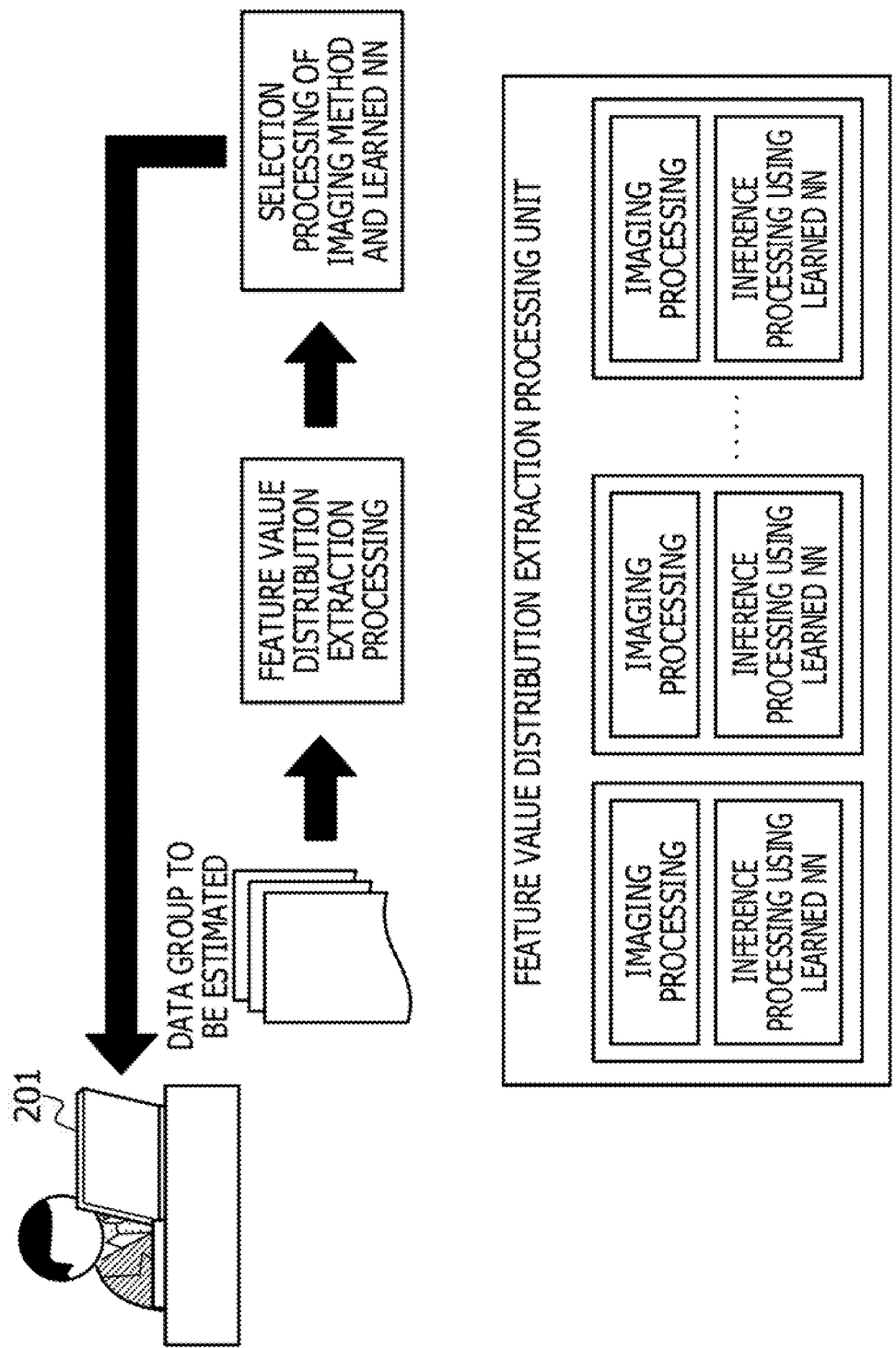
FIG. 16 is an explanatory diagram (1) illustrating a usage example 1 of the information processor 100.

Referring to FIGS. 16 and 17, a usage example 1 of the information processor 100 will be described below.

FIGS. 16 and 17 are explanatory diagrams illustrating the usage example 1 of the information processor 100. In FIG. 16, the information processor 100 receives the data group to be estimated from the client device 301. Based on the data group to be estimated, the information processor 100 executes distribution extraction processing of feature values, and selection processing of the imaging method and the trained NN.

For each combination of the imaging method and the trained NN, the distribution extraction processing executes imaging processing and inference processing using the trained NN, and extracts the distribution of feature values. An example of the distribution extraction processing will be described later with reference to a flow chart in FIG. 22, for example. The selection processing refers to the optimum combination score based on the distribution of the feature values, and generate a list in which a plurality of combinations of the imaging method and the trained NN are sorted in descending order of optimum combination score. An example of the selection processing will be described later with reference to a flow chart in FIG. 23, for example.

The information processor 100 transmits the list in which the plurality of combinations of the imaging method and the trained NN are sorted in descending order of optimum combination score to the client device 301. An example of the list will be described later with reference to FIG. 17, for example. The client device 301 displays the received list on a display 506. Referring to FIG. 17, an example of the list displayed on the display 506 by the client device 301 will be described below.

As illustrated in FIG. 17, the client device 301 receives a list 1700, and displays the list on the display 506. The list 1700 associates the ranking of the optimum combination score of the combination, the optimum combination score of the combination, the type of the trained NN included in the combination, and the type of the imaging method included in the combination with one another. Thereby, the classification operator may refer to the list 1700 to recognize which combination of the imaging method and the trained NN is the suitable combination for the data group to be estimated. Accordingly, the classification operator may reduce operation loads.

(Usage Example 2 of Information Processor 100)

Figure 18:
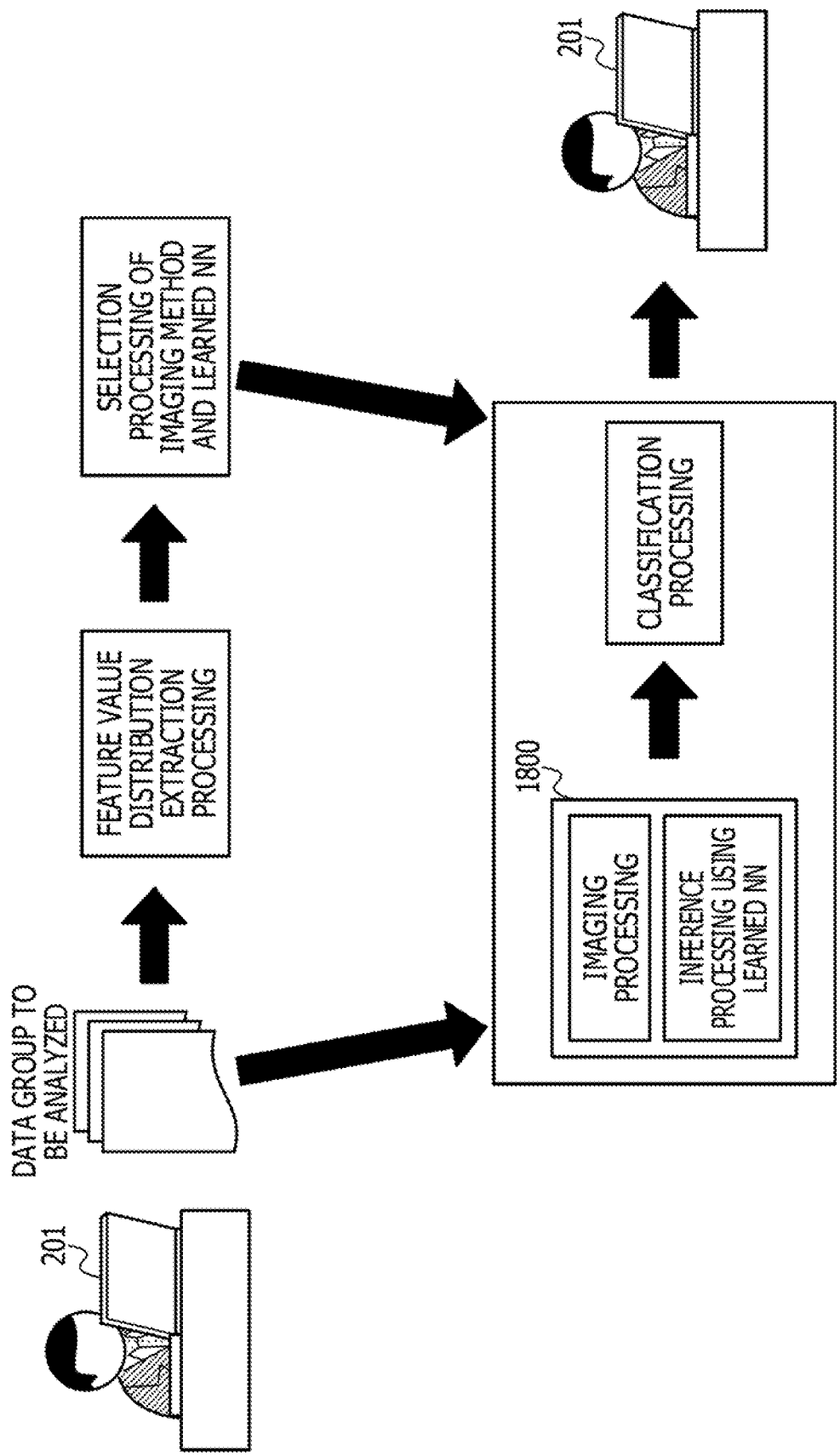
FIG. 18 is an explanatory diagram (1) illustrating a usage example 2 of the information processor 100.
Figure 19:
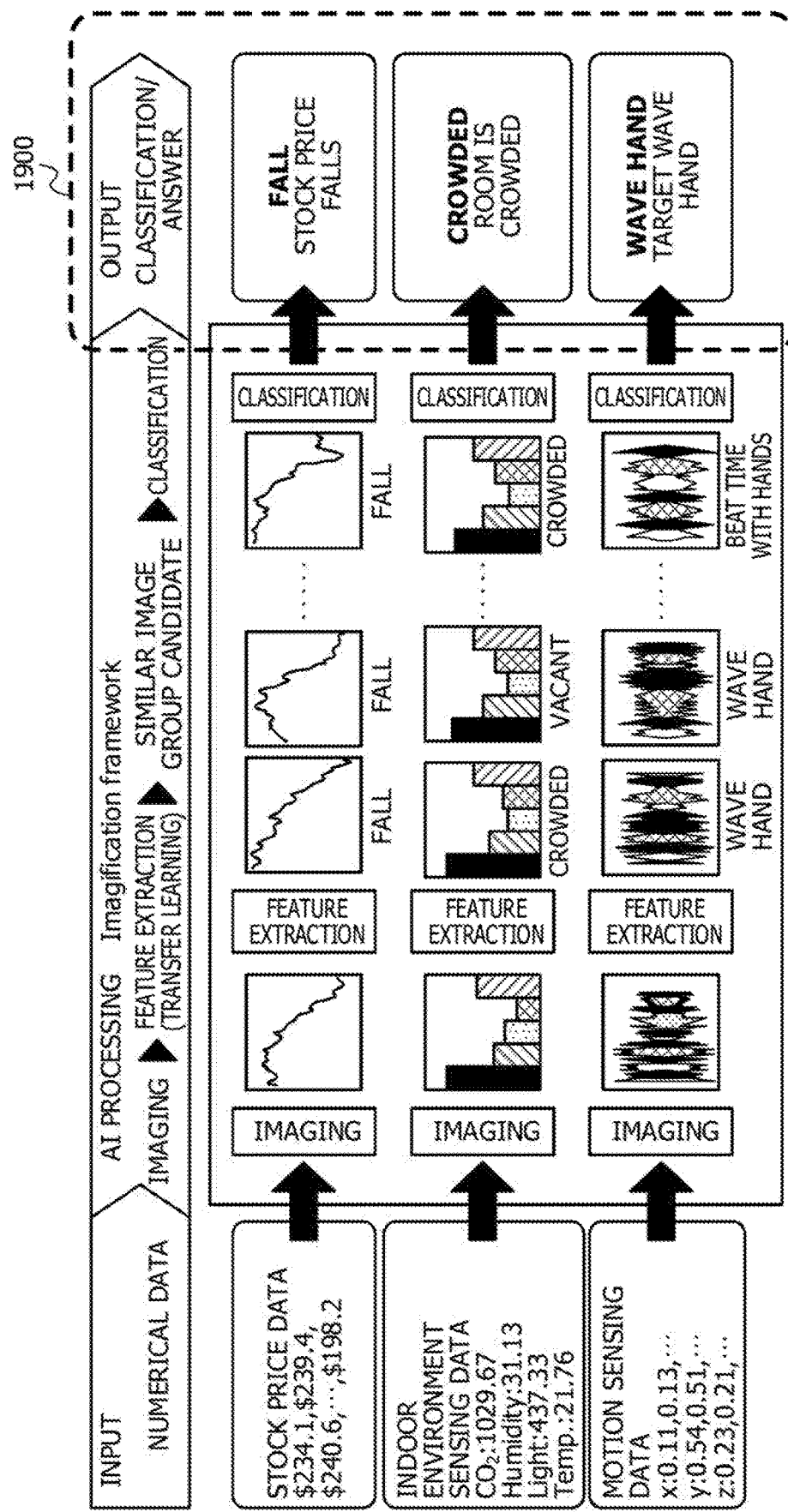
FIG. 19 is an explanatory diagram (2) illustrating the usage example 2 of the information processor 100.

Referring to FIGS. 18 and 19, a usage example 2 of the information processor 100 will be described below.

FIGS. 18 and 19 are explanatory diagrams illustrating the usage example 2 of the information processor 100. In FIG. 18, the information processor 100 receives data group to be analyzed from the client device 301. The information processor 100 samples the data group to be analyzed to extract the data group to be estimated. Based on the data group to be estimated, the information processor 100 executes distribution extraction processing of feature values, and selection processing of the imaging method and the trained NN.

For each combination of the imaging method and the trained NN, the distribution extraction processing executes imaging processing and inference processing using the trained NN, and extracts the distribution of feature values. An example of the distribution extraction processing will be described later with reference to a flow chart in FIG. 22, for example. The selection processing refers to the optimum combination score based on the distribution of the feature values, and generate a list in which a plurality of combinations of the imaging method and the trained NN are sorted in descending order of optimum combination score. An example of the selection processing will be described later with reference to a flow chart in FIG. 23, for example.

Referring to the list in which the plurality of combinations of the imaging method and the trained NN are sorted in descending order of optimum combination score, the information processor 100 selects any combination 1800, and uses the combination 1800 for the classification processing of the data group to be analyzed. The information processor 100 selects, for example, the combination 1800 having the maximum optimum combination score, executes imaging processing according to the imaging method in the combination 1800 and inference processing using the trained NN in the combination 1800, and uses the combination for the classification processing of the data group to be classified. The information processor 100 transmits a result of the classification processing to the client device 301. The client device 301 displays the result of the classification processing on the display 506. Next, description continues with reference to FIG. 19.

As illustrated in FIG. 19, the information processor 100 receives various data groups to be analyzed from one or more client devices 301. Examples of the data group to be analyzed include stock price data, indoor environment sensing data, and motion sensing data. As in FIG. 18, the information processor 100 may select the combination of the imaging method and the trained NN, which is suitable for each data group to be analyzed.

Then, as in FIG. 18, the information processor 100 applies the classification processing to the data groups to be analyzed using the selected combination to classify the data groups to be analyzed. The information processor 100 transmits classification results 1900 of the data groups to be analyzed to the respective client devices 301 that are sources of the data groups to be analyzed. The client device 301 receives the classification results of the data groups to be analyzed, and displays the classification results on the display 506. Thereby, the classification operator may use the combination of the imaging method and the trained NN, which is suitable for the data group to be analyzed, to recognize the classification result acquired by accurately classifying the data group to be analyzed, reducing operation loads.

Even when receiving a certain form of data group to be analyzed as well as various forms of data groups to be analyzed, the information processor 100 may select the suitable combination of the imaging method and the trained NN for the data group to be analyzed. Accordingly, the information processor 100 may be applied to various forms of data groups to be analyzed, and improve the convenience.

(Whole Processing Procedure in Usage Example 1)

Figure 20:
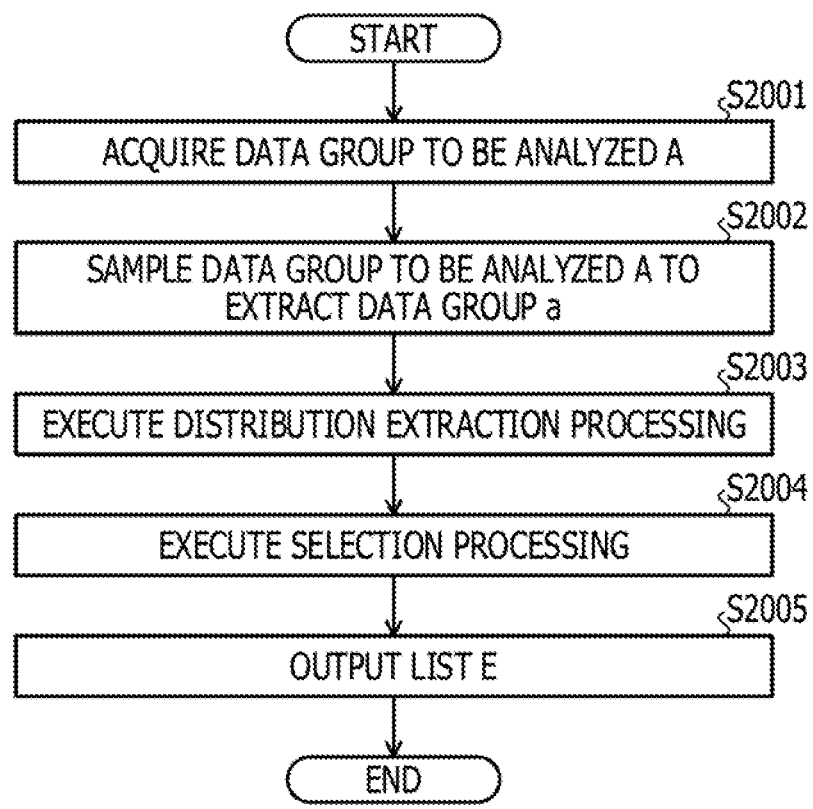
FIG. 20 is a flow chart illustrating an example of the whole processing procedure in the usage example 1.

Referring to FIG. 20, an example of the whole processing procedure in the usage example 1 implemented by the information processor 100 will be described below. The entire processing is realized by, for example, the CPU 401, the storage areas of the memory 402, the recording medium 405, and the like, and the network I/F 403 illustrated in FIG. 4.

FIG. 20 is a flow chart illustrating the example of the whole processing procedure in the usage example 1. In FIG. 20, the information processor 100 acquires a data group to be analyzed A (Step S2001). Then, the information processor 100 samples the data group to be analyzed A to extract a data group a (Step S2002).

Next, the information processor 100 executes distribution extraction processing described later with reference to FIG. 22 (Step S2003). Then, the information processor 100 executes selection processing described later with reference to FIG. 23 (Step S2004). Next, the information processor 100 outputs a list E (Step S2005). Then, the information processor 100 ends the entire processing.

(Whole Processing Procedure in Usage Example 2)

Figure 21:
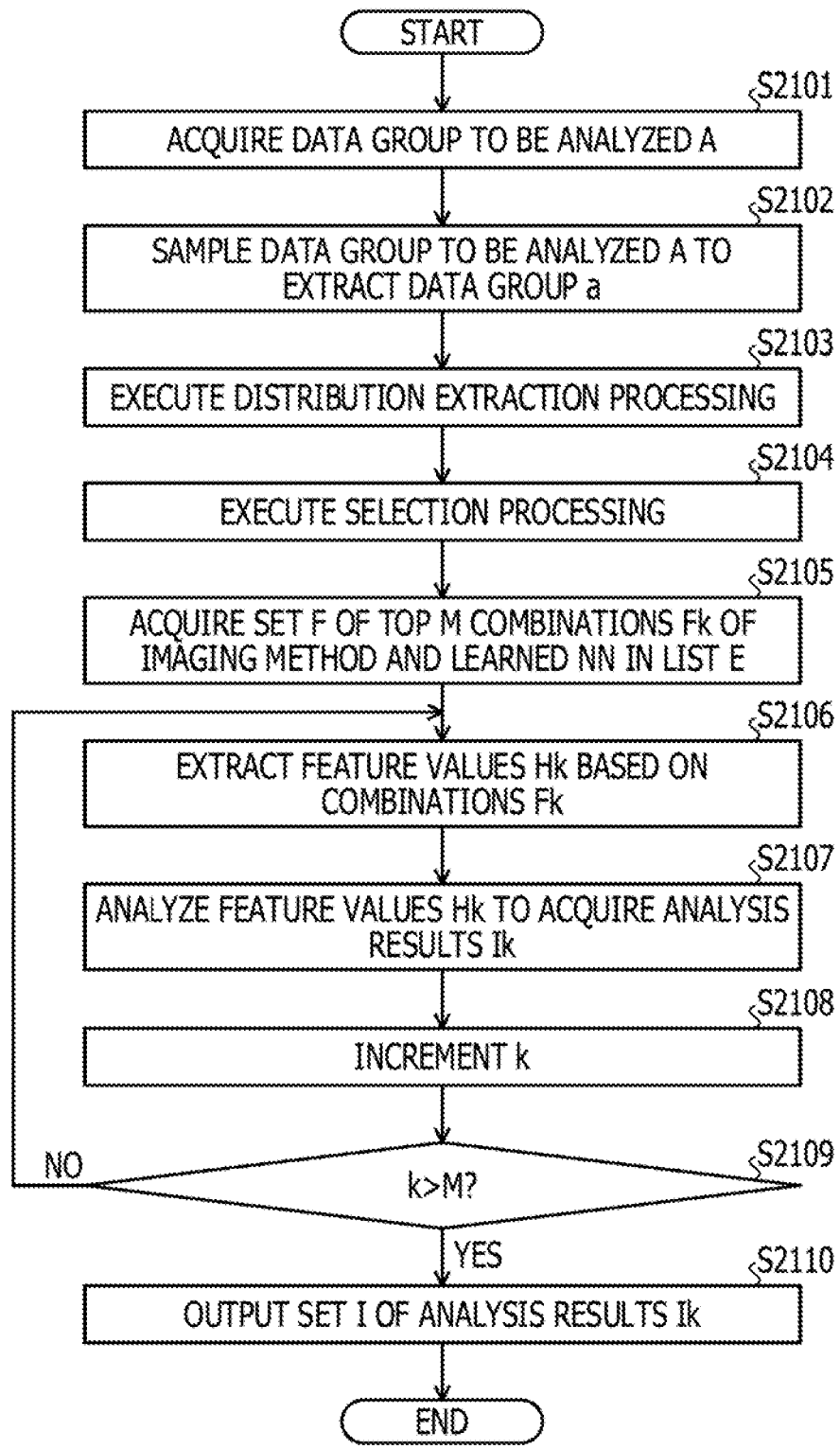
FIG. 21 is a flow chart illustrating an example of the whole processing procedure in the usage example 2.

Referring to FIG. 21, an example of the whole processing procedure in the usage example 2 executed by the information processor 100 will be described below. The entire processing is realized by, for example, the CPU 401, the storage areas of the memory 402, the recording medium 405, and the like, and the network I/F 403 illustrated in FIG. 4.

FIG. 21 is a flow chart illustrating the example of the whole processing procedure in the usage example 2. In FIG. 21, the information processor 100 acquires the data group to be analyzed A (Step S2101). Then, the information processor 100 samples the data group to be analyzed A to extract the data group a (Step S2102).

Next, the information processor 100 executes the distribution extraction processing described later with reference to FIG. 22 (Step S2103). Then, the information processor 100 executes the selection processing described later with reference to FIG. 23 (Step S2104). Next, the information processor 100 acquires a set F of top M combinations Fk of the imaging method and the trained NN in the list E (Step S2105). Here, k=1 to M. An initial value of k is 1. Then, the information processor 100 extracts feature values Hk based on the combinations Fk (Step S2106).

Next, the information processor 100 analyzes the feature values Hk to acquire analysis results Ik (Step S2107). Then, the information processor 100 increments k (Step S2108). Next, the information processor 100 determines whether or not k is larger than M (Step S2109). Here, when k is not larger than M (Step S2109: No), the information processor 100 returns to the processing in Step S2106. On the contrary, when k is larger than M (Step S2109: Yes), the information processor 100 shifts to processing in Step S2110.

In Step S2110, the information processor 100 outputs a set I of the analysis results Ik (Step S2110). Then, the information processor 100 ends the entire processing.

(Distribution Extraction Processing Procedure)

Figure 22:
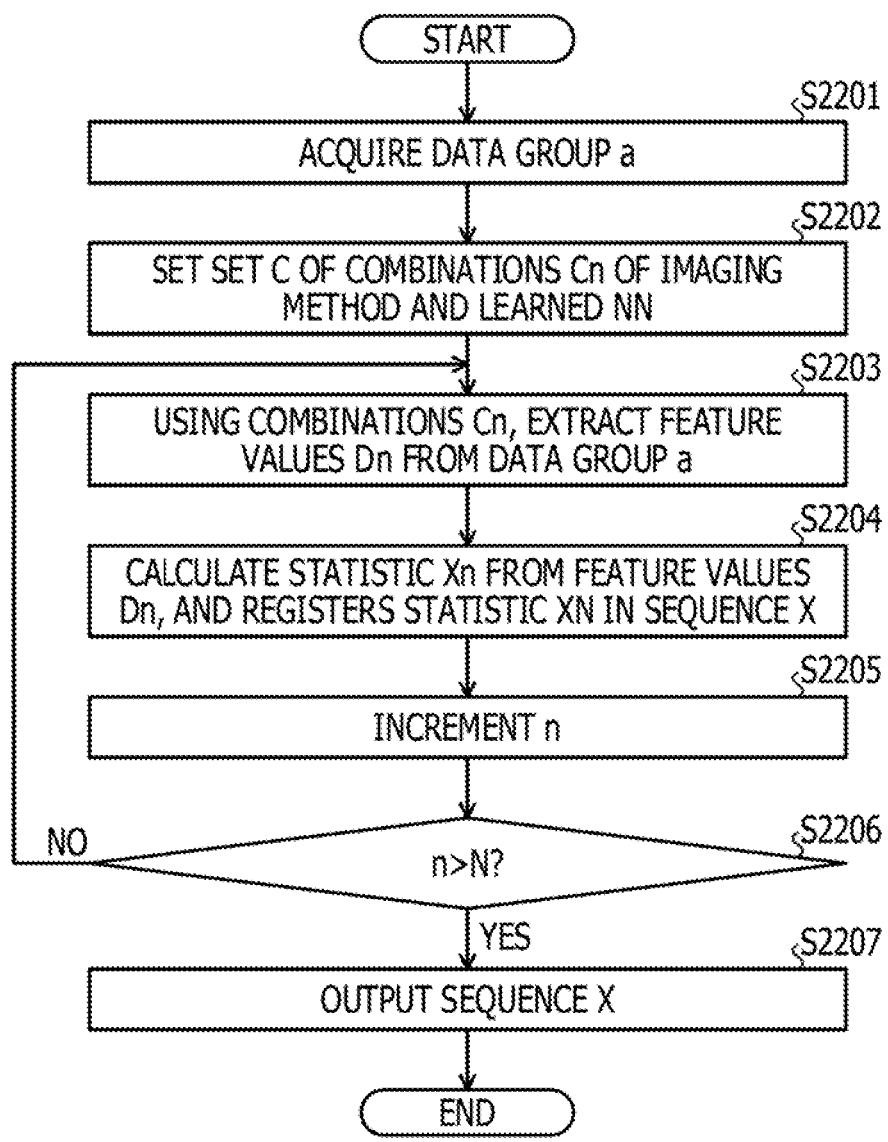
FIG. 22 is a flow chart illustrating an example of a distribution extraction processing procedure.

Referring to FIG. 22, an example of the distribution extraction processing procedure implemented by the information processor 100 will be described below. The distribution extraction processing is implemented by, for example, the CPU 401, the storage area such as the memory 402 or the recording medium 405, and the network I/F 403 illustrated in FIG. 4.

FIG. 22 is a flow chart illustrating an example of the distribution extraction processing procedure. In FIG. 22, the information processor 100 acquires a data group a (Step S2201). Next, the information processor 100 sets a set C of combinations Cn of the imaging method and the trained NN (Step S2202). Here, n=1 to N. An initial value of n is 1. N is the total number of combinations. Then, using the combinations Cn, the information processor 100 extracts feature values Dn from the data group a (Step S2203).

Next, the information processor 100 calculates a statistic Xn from the feature values Dn, and registers the statistic Xn in a sequence X (Step S2204). Then, the information processor 100 increments n (Step S2205). Next, the information processor 100 determines whether or not n is larger than N (Step S2206). When n is not larger than N (Step S2206: No), the information processor 100 returns to the processing in Step S2203. When n is larger than N (Step S2206: Yes), the information processor 100 shifts to processing in Step S2207.

In Step S2207, the information processor 100 outputs the sequence X (Step S2207). Then, the information processor 100 terminates the distribution extraction processing.

(Selection Processing Procedure)

Next, an example of a selection processing procedure executed by the information processor 100 is described with reference to FIG. 23. The selection processing is implemented by, for example, the CPU 401, the storage area such as the memory 402 or the recording medium 405, and the network I/F 403 illustrated in FIG. 4.

FIG. 23 is a flow chart illustrating an example of selection processing procedure. In FIG. 23, the information processor 100 acquires the sequence X (Step S2301). Next, the information processor 100 acquires a statistic B of feature values corresponding to the combination of the noise image group and the untrained NN (Step S2302). Then, the information processor 100 acquires a statistic G of feature values corresponding to the image group used for learning of the trained NN and the trained NN (Step S2303).

Next, the information processor 100 calculates a score S and a score T, based on the sequence X, the statistic B, and the statistic G (Step S2304). Then, the information processor 100 calculates the optimum combination score based on the score S and the score T, for each of the combinations Cn of the imaging method and the trained NN (Step S2305).

Next, the information processor 100 sorts the combinations Cn of the imaging method and the trained NN in the descending order of the optimum combination score to create the list E (Step S2306). Then, the information processor 100 outputs the list E (Step S2307). Then, the information processor 100 terminates the selection processing.

As has been described, the information processor 100 may acquire the plurality of image groups generated by imaging the data group according to the imaging method. For each of the acquired image groups, the information processor 100 may calculate the score of the imaging method used to generate the image group, based on the distribution of the feature value group acquired from the image group using the trained model and the feature value group acquired from the first reference image group using the trained model. The information processor 100 may output the score of the imaging method, which is calculated for each of the image groups. Thereby, the information processor 100 may examine which of the plurality of imaging methods is the suitable imaging method for the classification target with a relatively small operation amount. Then, the information processor 100 may facilitate the classification operator to refer to the score and recognize which of the plurality of imaging methods is the suitable imaging method for the classification target.

The information processor 100 may acquire a plurality of combinations of the image group generated by imaging the data group according to the imaging method and the trained model. For each of the acquired combinations, the information processor 100 may calculate the score of the imaging method used to generate the image group, based on the distribution of the feature value group acquired from the image group using the trained model and the feature value group acquired from the first reference image group using the trained model. For each of the acquired combinations, the information processor 100 may calculate the score of the trained model, based on the distribution of the feature value group acquired from the image group using the trained model and the feature value group acquired from the image group using the reference model. The information processor 100 may output the score of the imaging method and the score of the trained model, which are calculated for each of the combinations. Thereby, the information processor 100 may examine which combination of the imaging method and the trained model is the suitable combination for the classification target with a relatively small operation amount.

For each of the acquired combinations, the information processor 100 may further calculate the score of the trained model, based on the distribution of the feature value group acquired from a second reference image group using a reference model. Thereby, the information processor 100 may improve the calculation accuracy of the score of the trained model. The information processor 100 may also calculate the score of the trained model even when the number of dimensions of the feature value space varies.

The information processor 100 may select any of a plurality of combinations, based on the score of the imaging method and the score of the trained model, which are calculated for each of the combinations. The information processor 100 may associate the imaging method used to generate the image group in the selected combination with the trained model in the selected combination, and output them. Thereby, the information processor 100 may facilitate the classification operator to recognize which combination of the imaging method and the imaging method is suitable for the classification target.

The information processor 100 may use the trained model in the selected combination to classify the data group, based on the feature value group acquired from the image group generated by imaging the data group according to the imaging method used to the image group in the selected combination. The information processor 100 may output a classification result. Thereby, the information processor 100 may facilitate the classification operator to use the suitable combination of the imaging method and the trained model for an analysis target, and recognize a classification result acquired by accurately classifying the analysis target.

When receiving the data set to be classified, the information processor 100 may extract the data group from the data set. Thereby, the information processor 100 may reduce throughput required to calculate the score of the imaging method or the score of the trained model.

The information processor 100 may use the trained model in the selected combination to classify the data set, based on a feature value set acquired from an image set generated by imaging the data set according to the imaging method used to generate the image group in the selected combination. The information processor 100 may output a classification result. Thereby, the information processor 100 may facilitate the classification operator to use the suitable combination of the imaging method and the trained model for an analysis target, and recognize a classification result acquired by accurately classifying the analysis target.

The information processor 100 may accept designation of a plurality of imaging methods. The information processor 100 may acquire the image group generated by imaging the data group according to each of the plurality of designated imaging method. Thereby, the information processor 100 may examine which of the plurality of designated imaging methods is the suitable imaging method for the classification target.

The information processor 100 may use the neural network as the trained model. Thereby, the information processor 100 may reuse the neural network as the trained model.

The information processor 100 may use the same image group as the first reference image group as the second reference image group. Thereby, the information processor 100 may reduce operation loads of preparing the second reference image group.

The information processor 100 use the image group used to generate the trained model as a first reference image group. Thereby, the information processor 100 may improve the calculation accuracy of the score of the imaging method.

The information processor 100 may use the untrained model that is a source of the trained model as the reference model. Thereby, the information processor 100 may improve the calculation accuracy of the score of the trained model.

The information processor 100 may acquire a plurality of trained models. For each of the acquired trained models, the information processor 100 may calculate the score of the trained model, based on the distribution of the feature value group acquired from a predetermined image group using the trained model and the feature value group acquired from the predetermined image group using the reference model. The information processor 100 may output the score of the trained model, which is calculated for each of the trained models. Thereby, the information processor 100 may examine which of the plurality of trained models is the trained model is suitable for the classification target with a relatively small operation amount. Thus, the information processor 100 may facilitate the classification operator to refer to the score and recognize which of the plurality of trained models is the suitable trained model for the data.

The information processing method described in this embodiment may be realized by executing a program prepared in advance on a computer such as a personal computer or a workstation. The information processing program described according to the present embodiment is recorded on a computer-readable recording medium such as a hard disk, a flexible disk, a compact disc (CD)-ROM, a magneto-optical (MO) disc, or a digital versatile disc (DVD) and is executed as a result of being read from the recording medium by the computer. The information processing program described according to the present embodiment may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method implemented by a computer, the information processing method comprising:
    acquiring an image group generated by imaging a data group according to each of a plurality of imaging methods;
    for each of the acquired image groups, calculating a score of the imaging method used to generate the image group, based on distribution of a first feature value group in a feature value space and distribution of a second feature value group in the feature value space, the first feature value group being a plurality of feature values output in response that the image group is input to a trained model outputting feature values corresponding to input images, the second feature value group being a plurality of feature values output in response that a reference image group is input to the trained model; and
    outputting the score of the imaging method, the score being calculated for each of the image groups,
    wherein the acquiring of the image group is configured to acquire a plurality of combinations of the image group generated by imaging the data group according to the imaging method and the trained model outputting the feature values corresponding to the input images,
    the calculating of the score is configured to
        calculate, for each of the acquired combinations, the score of the imaging method used to generate the image group in the combination, based on distribution of the first value group in the feature space and the distribution of the second feature value group, the first feature value group being a plurality of feature values output in response that the image group in the combination is input to the trained model in the combination, the second feature value group being a plurality of feature values output in response that the reference image group is input to the trained model in the combination, and
    the outputting of the imaging method is configured to output, for each of the plurality of combinations, the score of the imaging method in the combination.

2. The information processing method according to claim 1, wherein
    the calculation processing further includes
    for each of the acquired combinations, calculating a score of the trained model in the combination, based on the distribution of the first feature value group output in response that the image group in the combination is input to the trained model in the combination, and distribution of a feature value group output in response that the image group in the combination is input to a reference model, and
    the outputting processing further includes
    outputting, for each of the plurality of combinations, the score of the trained model in the combination.

3. The information processing method according to claim 2, wherein the calculating of the score of the trained model is further configured to calculate, for each of the acquired combinations, the score of the trained model, based on distribution of a fourth feature value group in the feature value space, the fourth feature value group being a plurality of feature values output when a second reference image group is input to the reference model.

4. The information processing method according to claim 2, the information processing method further comprising:
    selecting any of the plurality of acquired combinations, based on the score of the imaging method and the score of the trained model, the scores being calculated for each of the plurality of combinations, and
    associating the imaging method used to generate the image group in the selected combination with the trained model in the selected combination, and
    outputting the associated imaging method and trained model.

5. The information processing method according to claim 4, the information processing method further comprising:
    classifying the data group, based on a feature value group output when the image group generated by imaging the data group according to the imaging method used to generate the image group in the selected combination is input to the trained model in the selected combination; and
    outputting a classification result.

6. The information processing method according to claim 1, wherein the acquiring of the image group is configured to extract the data group from a data set.

7. The information processing method according to claim 6, the information processing method further comprising:
    classifying the data set, based on a feature value set output when the image set generated by imaging the data set according to the imaging method used to generate the image group in the selected combination is input to the trained model in the selected combination; and
    outputting a classification result.

8. The information processing method according to claim 1, the information processing method further comprising:
    receiving an input indicating the plurality of imaging methods.

9. A non-transitory computer-readable storage medium for storing an information processing program which causes a processor to perform processing, the processing comprising:
    acquiring an image group generated by imaging a data group according to each of a plurality of imaging methods;

for each of the acquired image groups, calculating a score of the imaging method used to generate the image group, based on distribution of a first feature value group in a feature value space, and distribution of a second feature value group in the feature value space, the first feature value group being a plurality of feature values output when the image group is input to a trained model outputting feature values corresponding to input images, the second feature value group being a plurality of feature values output when a reference image group is input to the trained model; and outputting the score of the imaging method, the score being calculated for each of the image groups, wherein the acquiring of the image group is configured to acquire a plurality of combinations of the image group generated by imaging the data group according to the imaging method and the trained model outputting the feature values corresponding to the input images, the calculating of the score is configured to
calculate, for each of the acquired combinations, the score of the imaging method used to generate the image group in the combination, based on distribution of the first value group and the distribution of the second feature value group, the first feature value group being a plurality of feature values output in response that the image group in the combination is input to the trained model in the combination, the second feature value group being a plurality of feature values output in response that the reference image group is input to the trained model in the combination, and the outputting of the imaging method is configured to output, for each of the plurality of combinations, the score of the imaging method in the combination.

10. An information processing apparatus comprising:
a memory; and
a processor coupled to the memory, the processor being configured to
acquire an image group generated by imaging a data group according to each of a plurality of imaging methods;
calculate, for each of the acquired image groups, a score of the imaging method used to generate the image group, based on distribution of a first feature value group in a feature value space, and distribution of a second feature value group in the feature value space, the first feature value group being a plurality of feature values output when the image group is input to a trained model outputting feature values corresponding to input images, the second feature value group being a plurality of feature values output when a reference image group is input to the trained model; and
output the score of the imaging method, the score being calculated for each of the image groups, wherein the acquiring of the image group is configured to acquire a plurality of combinations of the image group generated by imaging the data group according to the imaging method and the trained model outputting the feature values corresponding to the input images, the calculating of the score is configured to
calculate, for each of the acquired combinations, the score of the imaging method used to generate the image group in the combination, based on distribution of the first value group and the distribution of the second feature value group, the first feature value group being a plurality of feature values output in response that the image group in the combination is input to the trained model in the combination, the second feature value group being a plurality of feature values output in response that the reference image group is input to the trained model in the combination, and the outputting of the imaging method is configured to output, for each of the plurality of combinations, the score of the imaging method in the combination.

11. An information processing method implemented by a computer, the information processing method comprising:
acquiring a plurality of trained models each outputting feature values corresponding to input images;
for each of the acquired trained models, calculating a score of the trained model, based on distribution of a first feature value group in a feature value space, and distribution of a second feature value group in the feature value space, the first feature value group being a plurality of feature values obtained in response that an image group is input to the trained model, the second feature value group being a plurality of feature values obtained in response that the image group is input to a reference model, and
outputting the score of the trained model, the score being calculated for each of the trained models, wherein the acquiring of the image group is configured to acquire a plurality of combinations of the image group and each of the plurality of trained models, the image group including a plurality of images, the calculating of the score is configured to
calculate, for each of the acquired combinations, a score of the trained model in the combination, based on the distribution of the first feature value group obtained by the trained model in the combination in response that each image of the image group in the combination is input to the trained model in the combination, and distribution of the second feature value group obtained by the reference model in response that each image of the image group in the combination is input to the reference model, and the outputting of the trained model is configured to output, for each of the plurality of combinations, the score of the trained model in the combination.

12. A non-transitory computer-readable storage medium for storing an information processing program which causes a processor to perform processing, the processing comprising:
acquiring a plurality of trained models each outputting feature values corresponding to input images;
for each of the acquired trained models, calculating a score of the trained model, based on distribution of a first feature value group in a feature value space, and distribution of a second feature value group in the feature value space, the first feature value group being a plurality of feature values obtained in response that an image group is input to the trained model, the second feature value group being a plurality of feature values obtained in response that the image group is input to a reference model, and
outputting the score of the trained model, the score being calculated for each of the trained models, wherein the acquiring of the image group is configured to acquire a plurality of combinations of the image group and each of the plurality of trained models, the image group including a plurality of images, the calculating of the score is configured to
calculate, for each of the acquired combinations, a score of the trained model in the combination, based on the distribution of the first feature value group obtained by the trained model in the combination in response that each image of the image group in the combination is input to the trained model in the combination, and distribution of the second feature value group obtained by the reference model in response that each image of the image group in the combination is input to the reference model, and the outputting of the trained model is configured to output, for each of the plurality of combinations, the score of the trained model in the combination.

13. An information processing apparatus comprising:

a memory; and a processor coupled to the memory, the processor being configured to acquire a plurality of trained models each outputting feature values corresponding to input images;

calculate, for each of the acquired trained models, a score of the trained model, based on distribution of a first feature value group in a feature value space, and distribution of a second feature value group in the feature value space, the first feature value group being a plurality of feature values obtained in response that an image group is input to the trained model, the second feature value group being a plurality of feature values obtained in response that the image group is input to a reference model, and output the score of the trained model, the score being calculated for each of the trained models, wherein the acquiring of the image group is configured to acquire a plurality of combinations of the image group and each of the plurality of trained models, the image group including a plurality of images, the calculating of the score is configured to calculate, for each of the acquired combinations, a score of the trained model in the combination, based on the distribution of the first feature value group obtained by the trained model in the combination in response that each image of the image group in the combination is input to the trained model in the combination, and distribution of the second feature value group obtained by the reference model in response that each image of the image group in the combination is input to the reference model, and the outputting of the trained model is configured to output, for each of the plurality of combinations, the score of the trained model in the combination.

\* \* \* \* \*